INVENTOR
André Pierre Honoré Labat-Camy

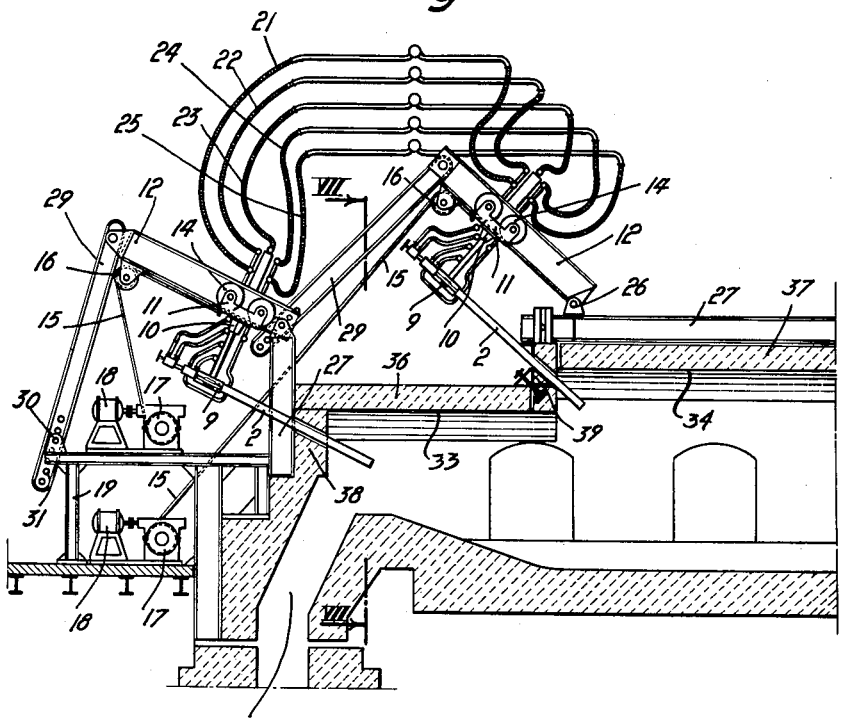
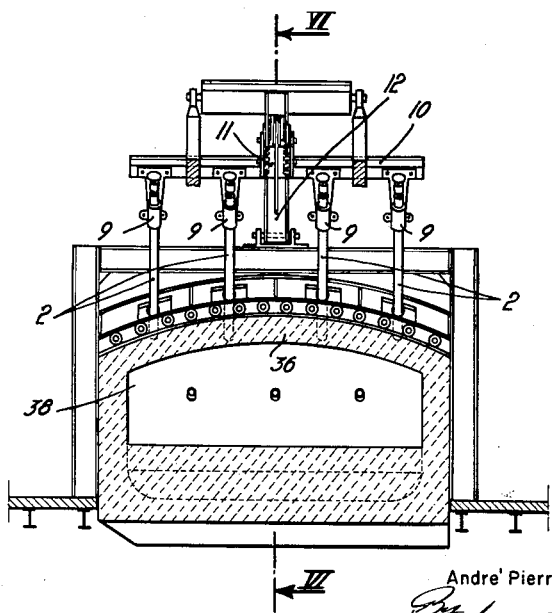

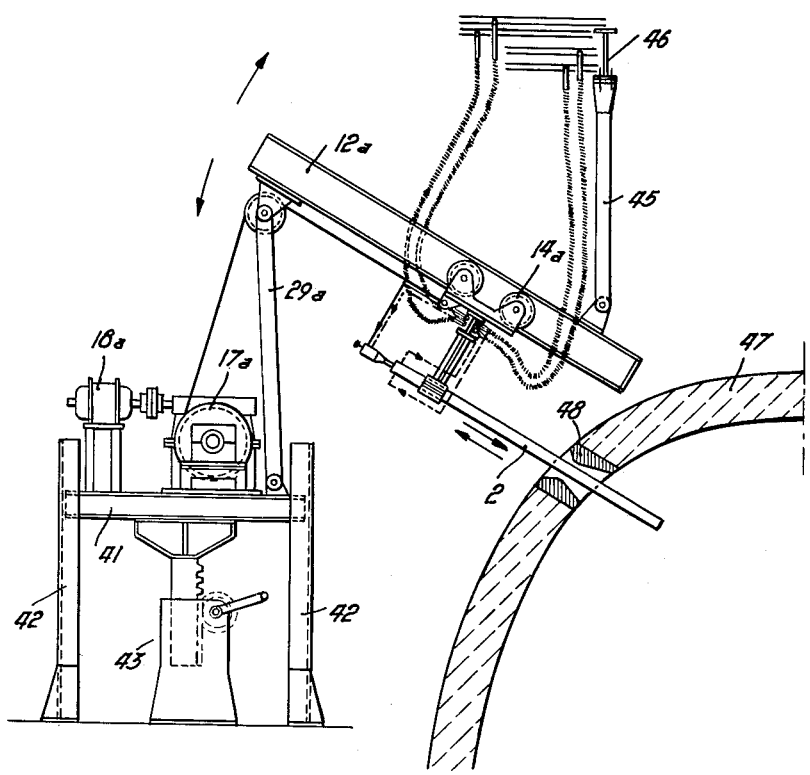

April 21, 1964 A. P. H. LABAT-CAMY 3,129,930
MOBILE ROOF BURNER SYSTEM FOR HEATING
OF OPEN HEARTH FURNACES OR THE LIKE
Filed Sept. 23, 1960 15 Sheets-Sheet 4
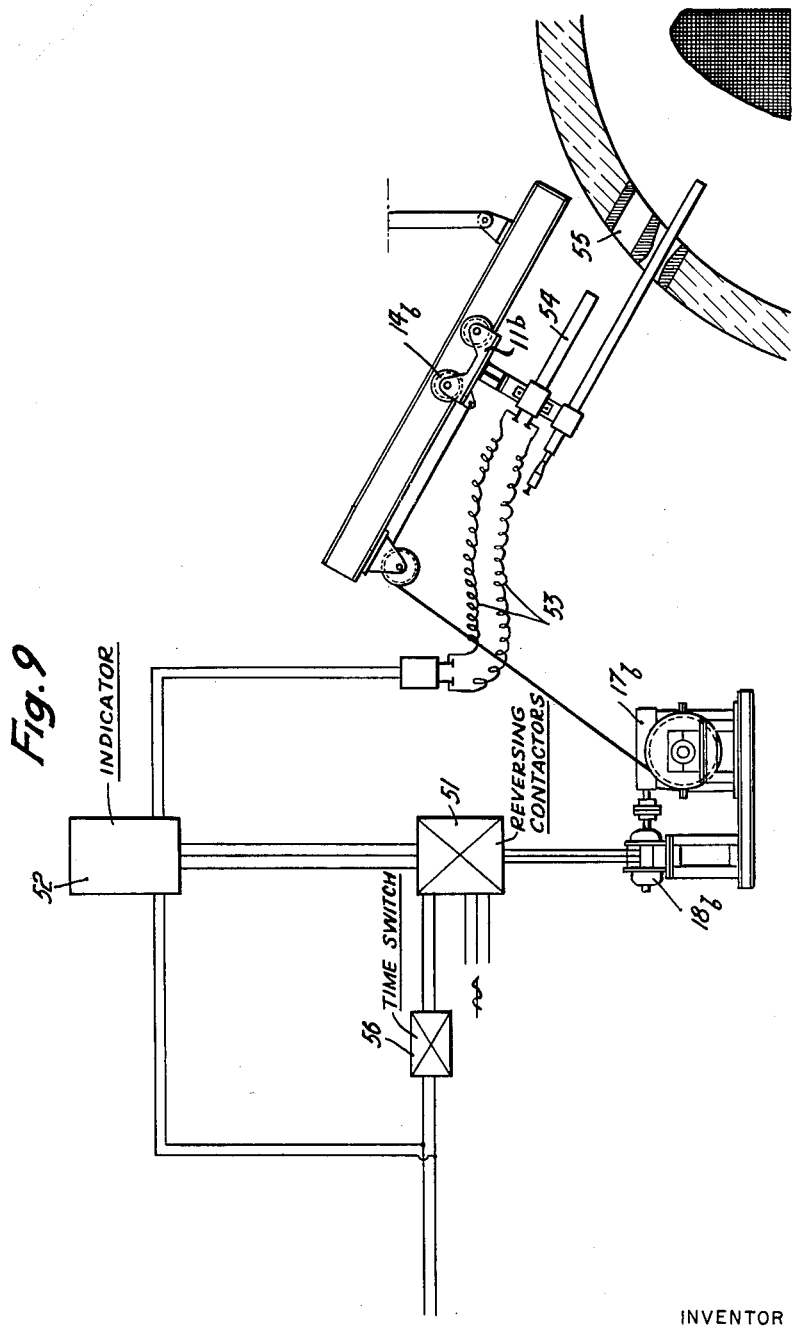
INVENTOR
André Pierre Honoré Labat-Camy INVENTOR
Andre' Pierre Honore' Labat-Camy

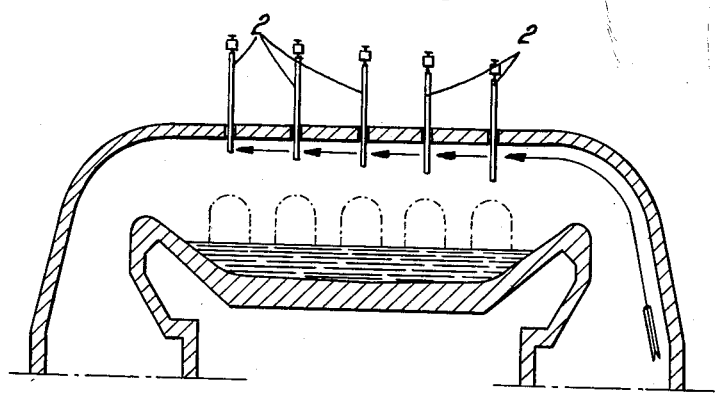
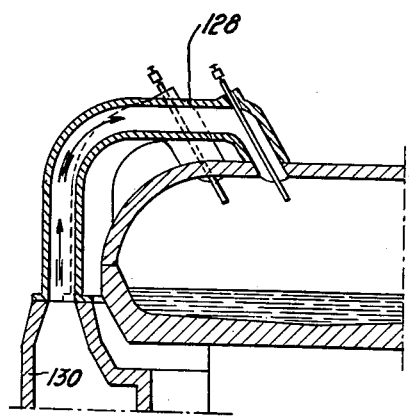
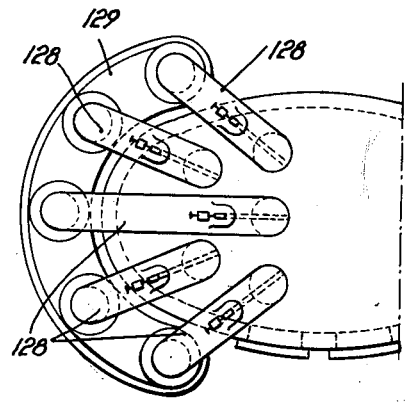

April 21, 1964  A. P. H. LABAT-CAMY  3,129,930
MOBILE ROOF BURNER SYSTEM FOR HEATING
OF OPEN HEARTH FURNACES OR THE LIKE
Filed Sept. 23, 1960  15 Sheets-Sheet 8
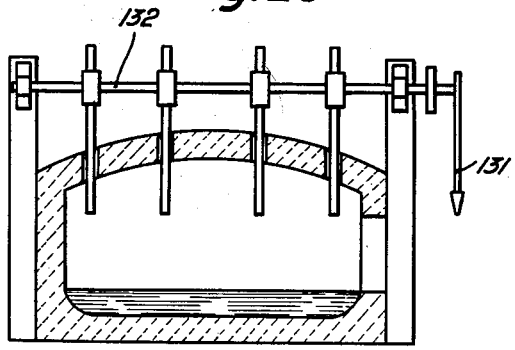
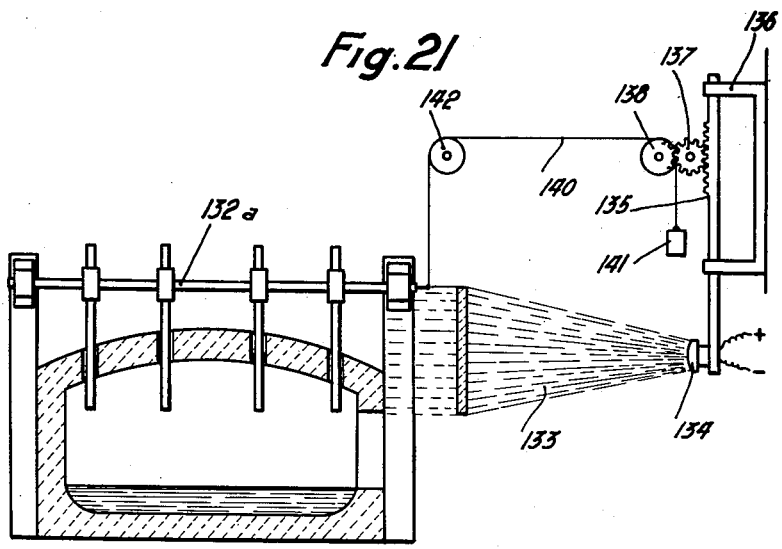
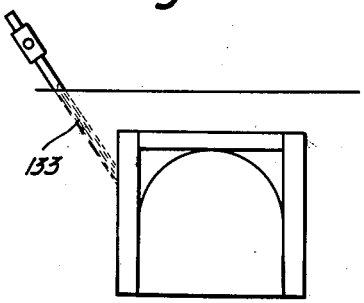
INVENTOR
André Pierre Honoré Labat-Camy
*Hopee Leonard & Duell*
*his attorneys*

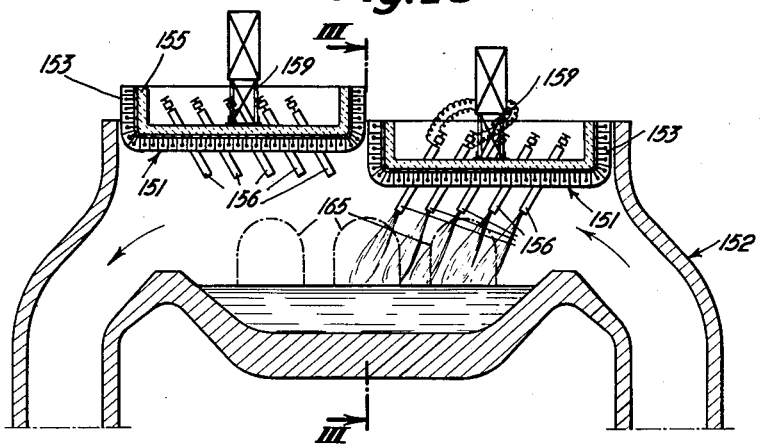
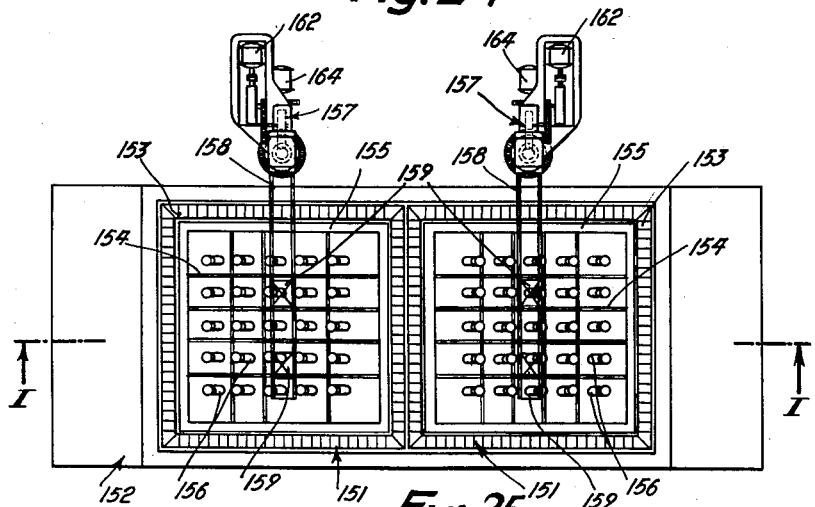
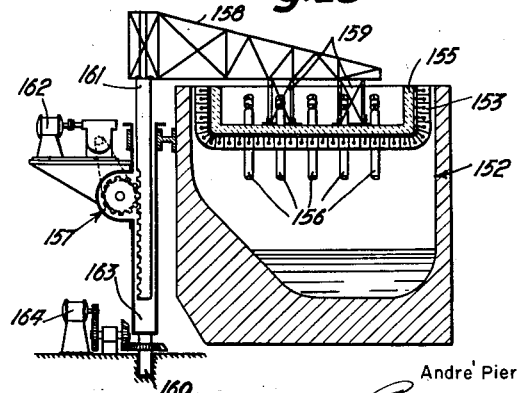
INVENTOR
André Pierre Honoré Labat-Camy

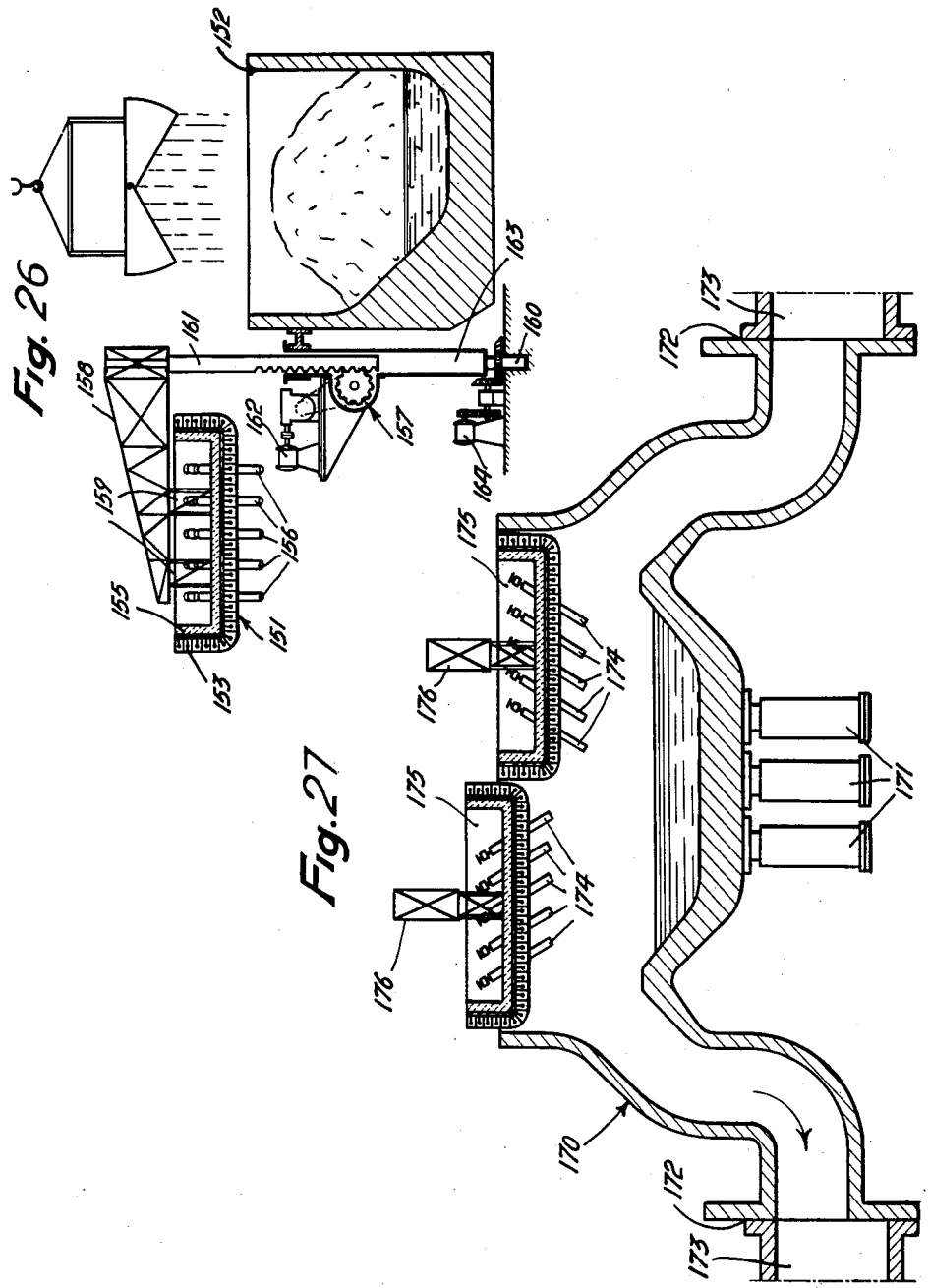

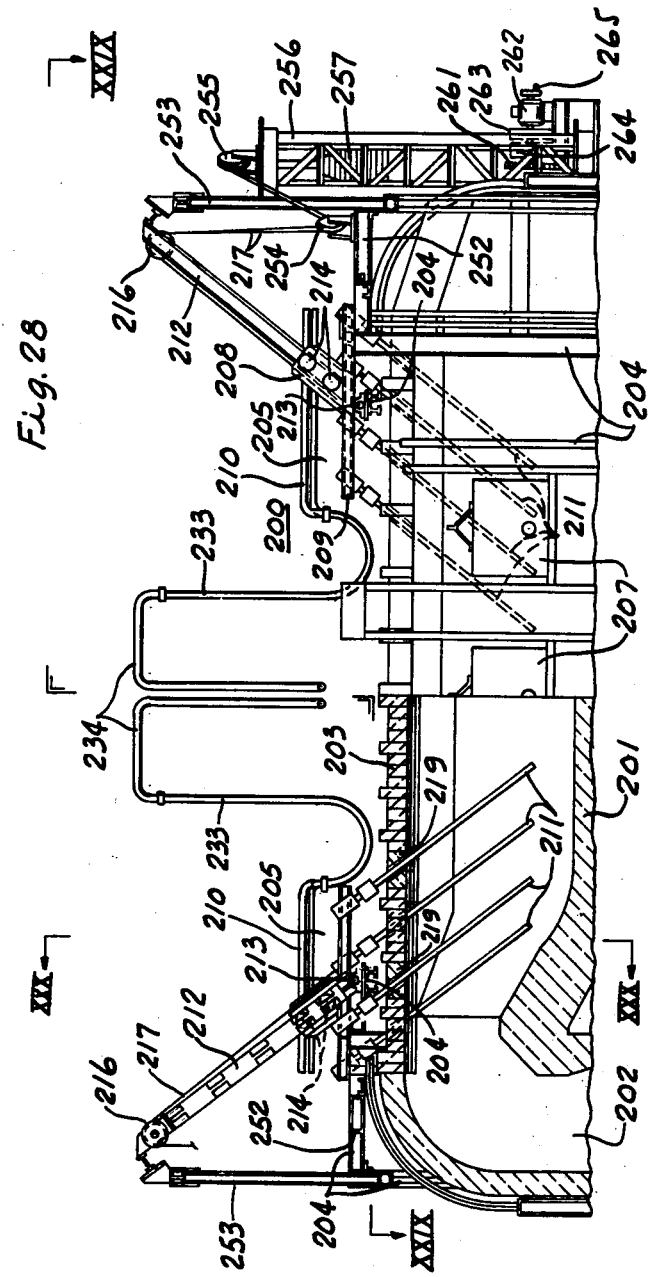

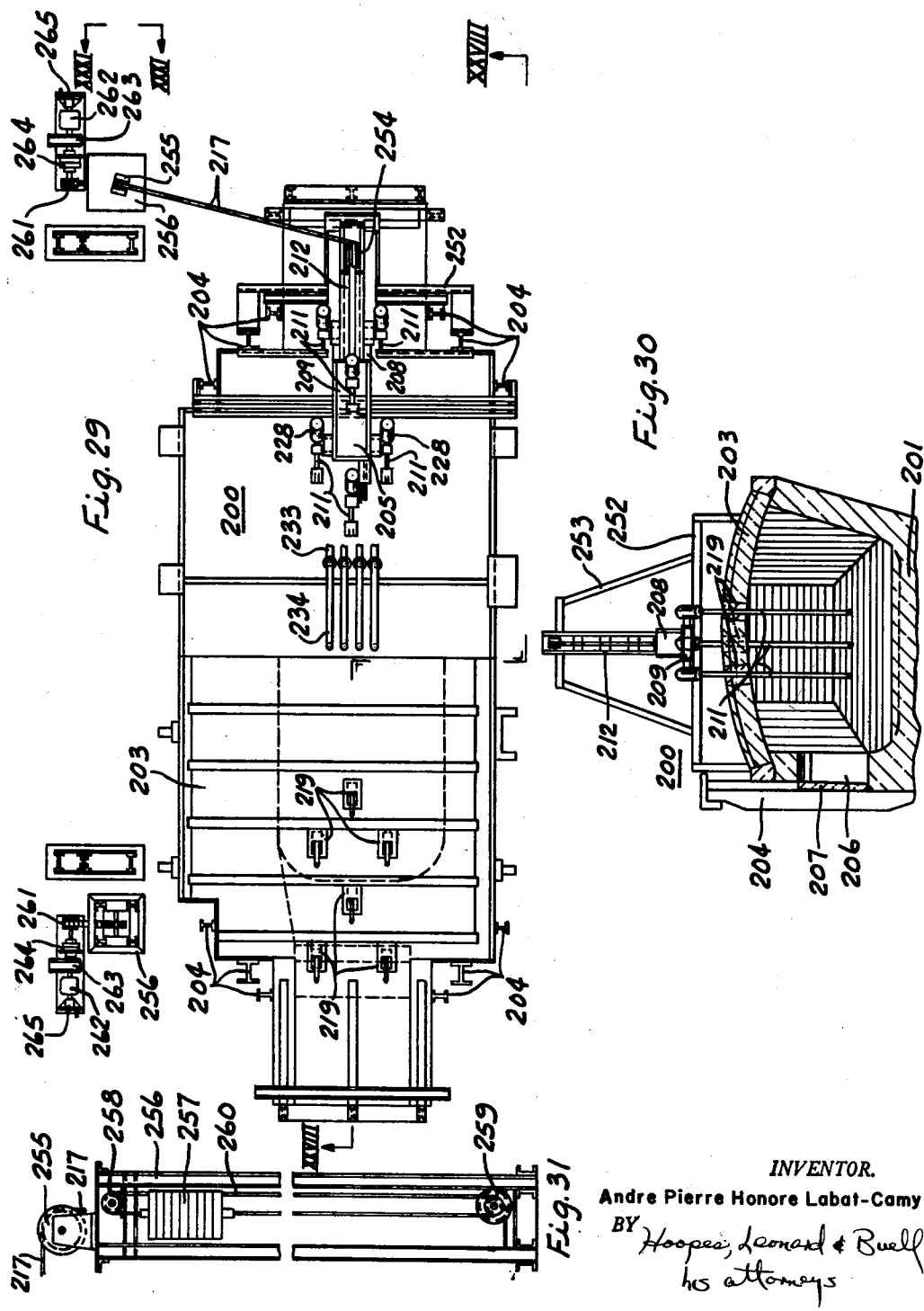

April 21, 1964   A. P. H. LABAT-CAMY   3,129,930
MOBILE ROOF BURNER SYSTEM FOR HEATING
OF OPEN HEARTH FURNACES OR THE LIKE
Filed Sept. 23, 1960   15 Sheets-Sheet 13
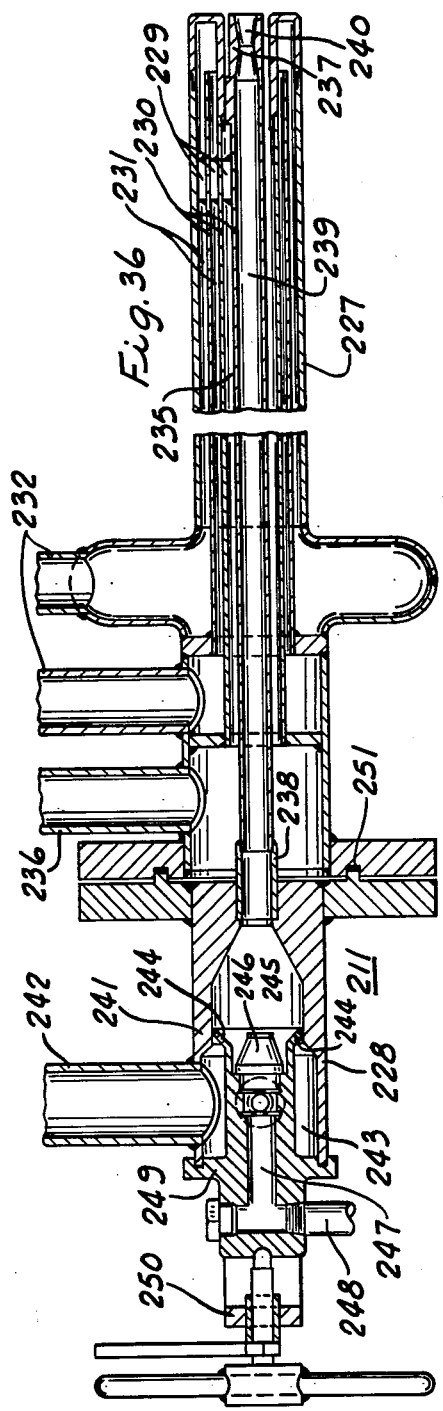
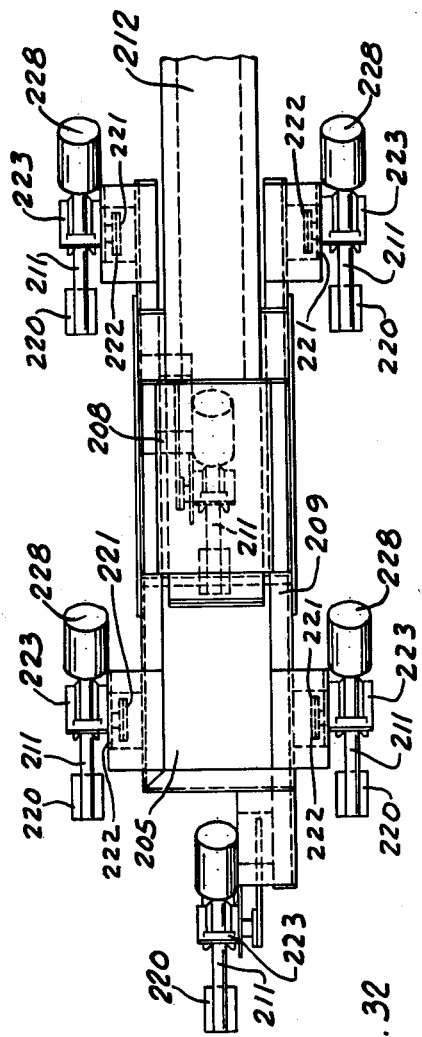
INVENTOR.
Andre Pierre Honore Labat-Camy
BY Hoopes, Leonard & Buell
his attorneys

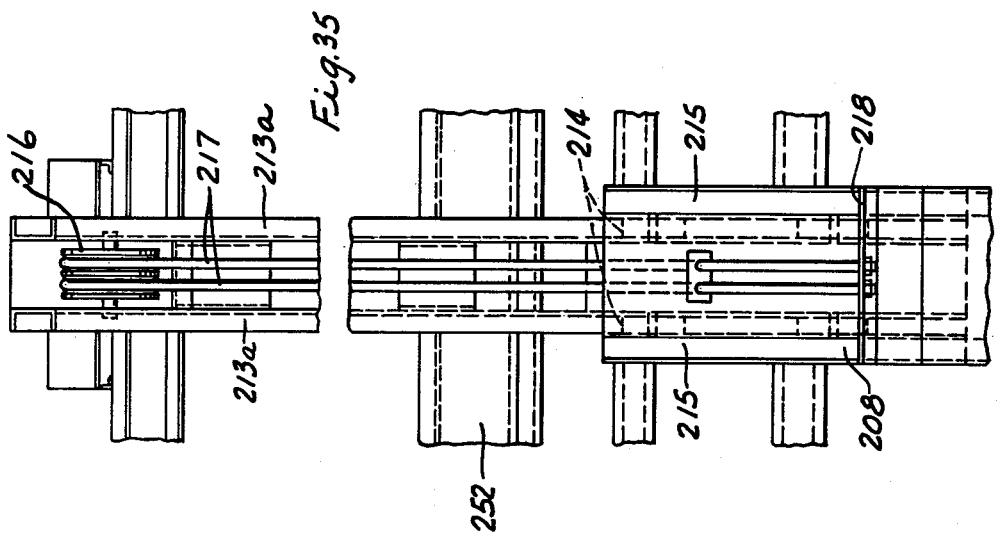
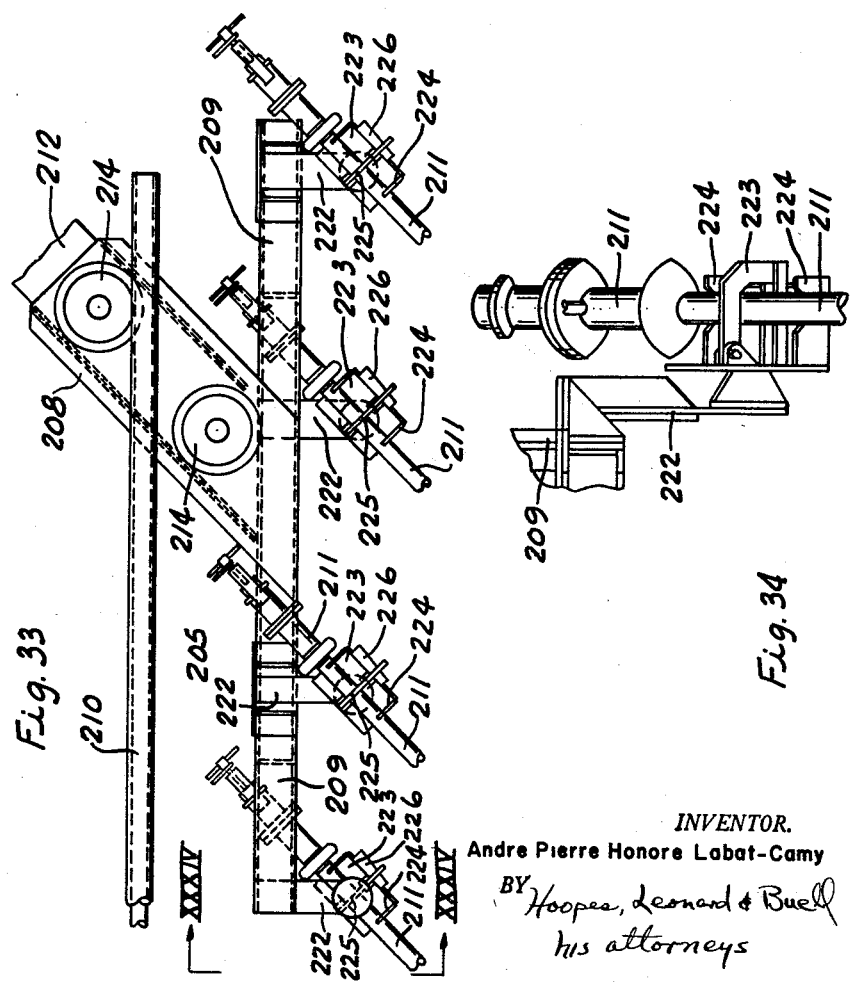

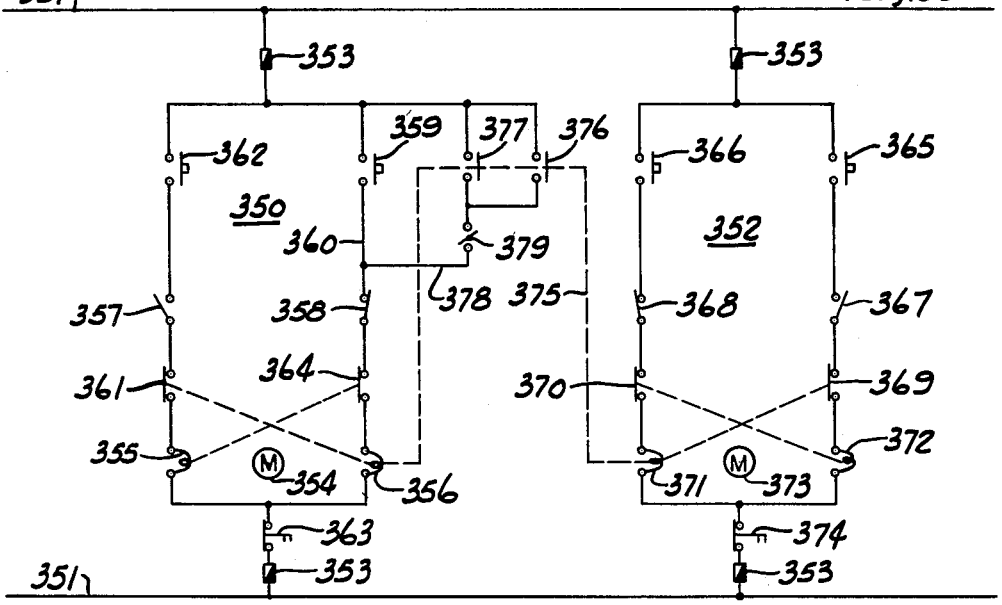
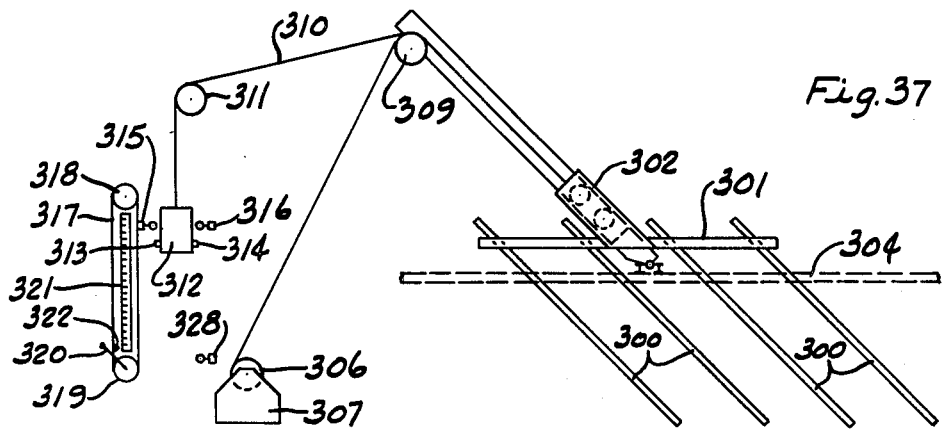
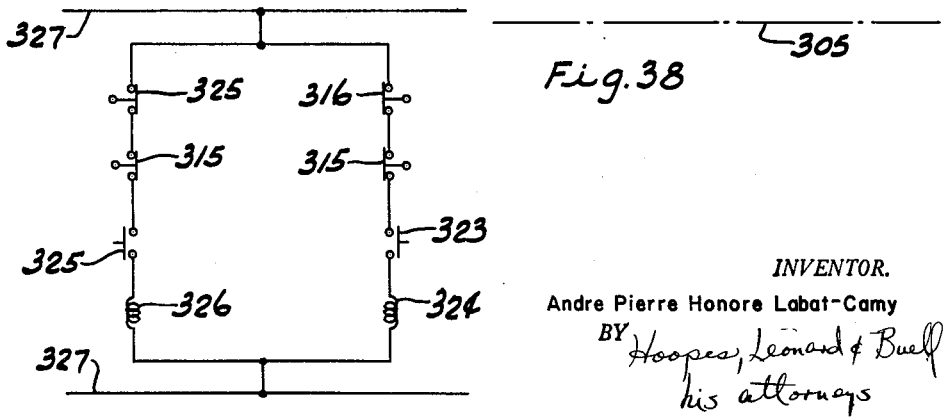

United States Patent Office 3,129,930
Patented Apr. 21, 1964

3,129,930
MOBILE ROOF BURNER SYSTEM FOR HEATING OF OPEN HEARTH FURNACES OR THE LIKE
André Pierre Honoré Labat-Camy, Saint-Mande, France, assignor to Establissement Brulex, Etude et Exploitation Pour Chauffage des Fours, Vaduz, Liechtenstein, a corporation of Liechtenstein
Filed Sept. 23, 1960, Ser. No. 58,096
Claims priority, application France Dec. 12, 1956
28 Claims. (Cl. 263—15)

This invention relates to apparatus and method for the heating of furnaces such as are used in the melting, or refining, or both, of various materials (e.g., open hearth steel-making, or glass melting and refining furnaces), whether or not such furnaces incorporate recuperative, regenerative, reversing, or reverberatory features. More particularly, my invention relates to a furnace system embodying direct-fired burners preferably in patterned arrangement for surface area heating operable at a selected distance from the material to be heated or heat treated to keep such material in the zone of maximum heating action of the burner flames and subject to optimum thermal action at fuel input rates selectively adjusted to achieve that action. This application is an in-put continuation of my application for United States Letters Patent Serial No. 702,396 filed December 12, 1957, now abandoned.

Two of the main objects of the invention are to increase the efficiency and output of such furnaces and to reduce the cost price per ton of product manufactured. Another object of the invention is to make it possible to further increase the size of these types of furnaces. Among more specific objects contributing to the attainment of the aforementioned objects, there might be mentioned among others: decrease in the fuel consumed per ton of manufactured product, increase in the speed of operations and increase in the number of operations per unit time; in the case of heating means constituted by burners, so positioning them as sources of the flames relative to the mass of the materials subjected to their action that these materials are constantly in the zone of maximum action of these flames, the protection of the roof of the furnace against the destructive action of the flames and, in consequence, longer periods between repairs to the roof, that is, between inactive periods of the furnaces and loss of less material due to local overheating.

It has already been proposed to heat the furnaces in question in dividing the total supply of heat into a plurality of distinct heat supplies disposed at various points above the material to be treated, this being obtained by means of burners extending through the roof of the furnace. However, my invention comprises an improved heating system which comprises separately controlling these heat supplies, alone or in groups, by varying either the position of the heat supply or both its position and its intensity relative to the hearth of the furnace, this being done preferably automatically as a function of certain variable factors taken from the variable factors dependent on the operation of the furnace, such as the distance between the heating means and the furnace charge, the temperature of the latter in the zone pertaining to the corresponding heat supply, analysis of the fumes, in the considered zone.

In the case where the heating means spaced along the furnace are burners having an oxygen supply, it may also be advantageous to arrange that the supply of oxygen increases in a direction from the input end to the output end of the furnace so as to compensate for a possible diminution in such direction in the available air supply of the burners in the form of a layer of comburent material flowing in the furnace. Further, it is advantageous to control this oxygen supply, preferably automatically, as a function of one or a plurality of the aforementioned variable factors or as a function of the analysis of a specimen of the treated product.

A further improvement in my invention in heating furnaces, which is preferably associated with the aforementioned first improvement, consists in varying the inner volume of the furnace during the melting or other heating of the charge so as to reduce, and thereby maintain constant, or substantially constant, the volume above the charge considered optimum for the development of the flames or the diffusion of heat, which would otherwise increase as the charge melts. This constant volume is particularly conducive to best possible efficiency, in particular in maintaining the highest temperature compatible with the operational conditions of the moment imposed by the state of the charge or bath of molten product. A furnace which is adapted to carry out said first improvement and comprises a number of heating means extending through its roof is characterized in that it comprises means by which it is possible to produce, during furnace operation, a relative vertical displacement between the hearth of the furnace and said heating means.

In one embodiment of such a furnace, the latter is vertically movable and said relative displacement is obtained by a vertical displacement of the furnace unit with the aid of shifting means, such as jacks or rams, whereas said heating means extending through the roof can remain stationary, preferably together with said roof, whereby the volume of the interior of the furnace is varied resulting in the aforementioned last improvement.

In another embodiment, said relative vertical displacement results from the fact that said heating means are supported, separately or in groups, in such manner that said heating means, or groups, thereof are movable transversely of the base of the furnace, shifting means being associated with each heating means, or each group thereof, for shifting them transversely of the base of the furnace.

If a plurality of heating means are carried by a common support and are displaced simultaneously, it is also advantageous that each of said heating means be movable separately relative to said common support so as to permit varying, if desired, its initial adjustment.

Advantageously, an indicator indicating the relative position occupied by the furnace and the heating means, or group of heating means, may be associated with these heating means.

Said heating means carried by a common support and movable simultaneously could constitute a longitudinal row of heating means or could be arranged both transversely and longitudinally and constitute a movable heat supply carriage.

It is also possible to construct a furnace in which at least a part of the roof, through which the heating means extend, is suspended from means permitting vertically displacing said roof.

Such an arrangement affords various possibilities and possible developments.

Firstly, it permits varying the volume of the interior of the furnace which results in the advantages mentioned hereinbefore. Further, if this arrangement is completed by arranging that the heating means extending through said movable part of the roof be made unitary with said part and be vertically movable with the latter, a relative vertical displacement between the hearth of the furnace and said heating means is obtained by a vertical displacement of said part of the roof, which displacement is achieved manually or automatically as a function of the factors mentioned hereinbefore for the relative vertical displacement between the hearth and the heating means. In this way, it is possible to dispense with the sliding of said heating means through the roof, although this sliding arrangement could also be provided if desired.

An interesting development of this arrangement is to arrange that said movable part of the roof unitary with said heating means is supported in such manner as to be capable of being entirely withdrawn from the furnace and then displaced on the side so as to clear the space it occupies in the furnace for charging or loading the furnace through the upper aperture thus provided.

The arrangement whereby heating means, or a group of the latter, is movable transversely of the base of the furnace, could be such that, in addition to this transverse movement and independently thereof or combined therewith, it is possible to vary the orientation, said shifting means then comprising in the first case two separately controlled mechanisms.

In their simplest form, said shifting means could be controlled manually. It is however advantageous to control them automaticaly or at least, if they comprise two separately-controlled mechanisms, to control at least the mechanism pertaining to the transverse displacement automatically.

Said automatic control could be of the predetermined program type or a function of furnace operation. In the former case, the simplest arrangement is a relative continuous displacement of the heating means or the group of the latter, and the charge at constant speed up to a predetermined extreme position, in which case the shifting means comprise driving means and automatic stop means for stopping this relative displacement, for example of the heating means or the group of the latter, at said extreme position. For a more complex program, having stoppage phases or variable speed of displacement, the shifting means comprise a program meter, such as a simple cam, and, if desired, means controlled by this cam or other program meter for varying the speed of displacement.

In the second case, the automatic means comprise driving means and responsive means responsive to furnace operation, for example means responsive to the temperature of the charge or of the slag, or sounding or measuring means of any type, which operate upon contact or at a distance, for example by ultrasonic means so disposed as to determine the position in the furnace of the part of the treated material to be heated by said heating means or the group of the latter in question, these responsive means controlling said driving means in such manner as to produce the relative displacement of said heating means or the group of the latter and the charge automatically so as to maintain the optimum relative position between said heating means, or the group of the latter, and the treated material.

This automatic control could be effected in a continuous or discontinuous manner and could occur at regular or irregular intervals during equal or unequal periods of time, for example as a result of discontinuous operation of said responsive means, which operation is started and stopped for example by an electrical time measurer or as a result of the fact that the driving means controlled by the responsive means shift the heating means, or the group of the latter, or the furnace only when there is a predetermined deviation from the value of the variable factor as a function of which the regulation is effected.

In one embodiment of the arrangement, whereby a heating means or group of the latter is adjustable in position, there is at least one slide, such as a carriage carrying the heating means on the transverse support for the group of heating means, this slide being movable along a guide outside the furnace, for example supported by the latter. In one embodiment of an orientating device for a heating means or a group of the latter, the support, disposed outside the furnace, for said heating means, for example said guide is pivotably mounted at its lower end for motion about an axis disposed transversely of the direction of gas circulation inside the furnace, for example on a member carried on the outside of the furnace.

In the case of furnaces having two ends and reversible operation, the spaced heating means are preferably disposed at points which are symmetrical relative to the transverse median plane of the furnace.

Another improvement consists in the fact that the spaced heating means, for example burners, introduced into the furnace through the roof at different points of the latter, are disposed in substantially staggered relation above the material to be heated, partly to obtain good distribution of the flames and partly—particularly when using burners supplied with comburent material by the gaseous layer circulating in the furnace—to obtain an improved supply of comburent material to these burners by this layer. For still more improving this supply, it is advantageous to arrange, by construction or regulation that the extent, to which the burners penetrate this layer decreases in the direction from the input end to the outlet end of the gaseous circulation inside the furnace.

A further improvement more particularly applicable in furnaces comprising burners spaced along the furnace, consists in the fact that the interior of the furnace has a substantially streamlined form so arranged that it ensures that there is established inside the furnace, by introduction of gaseous fluid at one end of the latter, a layer of this gaseous fluid which flows along the wall of at least the roof and preferably also the piers up to the opposite end and constitutes a heat insulating and coating screen for the wall travelled along and insures, owing to its regular flow, a rational and substantially constant supply of comburent material to the various burners.

In a simple embodiment of such an improvement, the streamlined form of the roof is only approximate and is constituted in the horizontal direction by a succession of inverted steps each of which has a part or counter-step which is substantially vertical and has, extending therethrough, one or more heating means, for example burners.

The furnaces equipped in accordance with the invention are of course within the scope of the latter, which also embraces processes of using these furnaces in the case of reverse operation furnaces; in one of these processes, simultaneous use is made only of the burners situated in the half of the furnace adjacent the head or end through which the air is supplied, the change over from one half of the burners to the other half occurring at the moment of reversing preferably in automatically timed relation to the latter.

Another operation within my invention comprises using simultaneously burners situated in both halves of the furnace and reversing any vertically staggered relation and their orientation they may have when starting operation upon a reversing of the furnace.

Further features and advantages of the invention will be apparent from the ensuing description with reference to the accompanying diagrammataic drawings to which the invention is in no way restricted, of various embodiments selected from many other possible embodiments.

In the drawings:

FIGURE 6 is a partial longitudinal sectional view taken along line VI—VI in FIGURE 7 of a furnace, the shifting means and the orientating means for the burners being shown diagrammatically but in greater detail;

FIGURE 7 is a sectional view taken along line VII—VII of FIGURE 6;

FIGURE 8 is a view similar to FIGURE 6 of a modification of the invention, only a portion of the roof of the furnace, shown in longitudinal section, and a single row of heating means being shown;

FIGURE 9 is a view of an embodiment of an automatic device controlling the position of the heating means, only the heating means corresponding to this automatic control device and a portion of the roof of the furnace and charge being shown;

FIGURES 10 and 11 are views of another embodiment of an automatic control device, FIGURE 10 showing the various devices pertaining to this automatic control and a part of the roof of the furnace and of the charge, whereas FIGURE 11 shows an electrical diagram of this control device;

FIGURES 16 and 17 are longitudinal sectional views of a reversible operation furnace showing the positions given to the burners according as the air is supplied through one or the other end of the furnace;

FIGURES 18 and 19 are views similar to FIGURES 12 and 13 respectively of another modification of the means supplying the comburent material or agent;

FIGURE 20 is a diagrammatic view of an indicator indicating the position of the heating means in the furnace, the latter being shown in cross-section with a single row of said heating means;

FIGURES 21 and 22 are diagrammatic longitudinal sectional and cross-sectional views respectively of a furnace equipped with an optical indicator of the position of the heating means;

FIGURE 23 is a longitudinal sectional view of a furnace having two ends and a roof comprising two vertically movable panels with the burners extending therethrough;

FIGURE 24 is a corresponding plan view;

FIGURE 25 is a cross-sectional view thereof in the median plane of the furnace;

FIGURE 26 is a view similar to FIGURE 25, one of the panels of the roof having been shifted to one side of the furnace to permit charging the latter from above, and FIGURE 27 is a diagrammatic longitudinal sectional view of a further furnace embodiment having vertically movable roof and hearth elements.

FIGURE 28 is a view in front elevation, partly in section, of a presently preferred embodiment of my invention taken along line XXVIII—XXVIII of FIGURE 29;

FIGURE 29 is a view in plan, partly in section, of the embodiment illustrated in FIGURE 28 taken along line XXIX—XXIX of FIGURE 28;

FIGURE 30 is a view in section taken along line XXX—XXX of FIGURE 28;

FIGURE 31 is a schematic view in elevation taken along line XXXI—XXXI of FIGURE 29;

FIGURE 32 is a plan view of a burner carriage provided above each half of the furnace embodiment illustrated in FIGURE 28;

FIGURE 33 is a view in side elevation of the carriage shown in FIGURE 32;

FIGURE 34 is a detail view in end elevation taken along line XXXIV—XXXIV of FIGURE 33;

FIGURE 35 is a view in front elevation of a runway on which the carriage shown in FIGURES 32 and 33, operates;

FIGURE 36 is a view in longitudinal section of a burner suitable for use in furnaces shown in the preceding figures;

FIGURE 37 is a schematic view of an alternative carriage operator mechanism utilizable in the embodiment of FIGURES 27 and 28;

FIGURE 38 is a schematic electrical diagram utilizable in connection with the operator mechanism shown in FIGURE 35; and FIGURE 39 is a schematic circuit utilizable in an embodiment of my invention to provide an interlock for automatic raising of furnace burners as and when a door to the furnace is opened, in order to move such burners out of the way.

Figure 1:
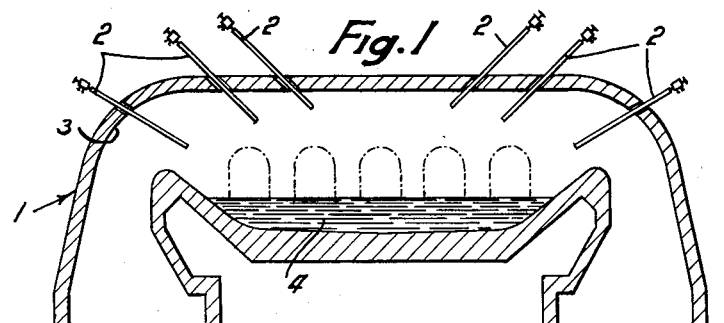
FIGURE 1 is a vertical longitudinal sectional view of an open-hearth furnace of the reverse operation type, equipped with multiple burners extending into the furnace in accordance with the invention, these burners being shown during operation the furnace charge being already in its molten state.
Figure 3:
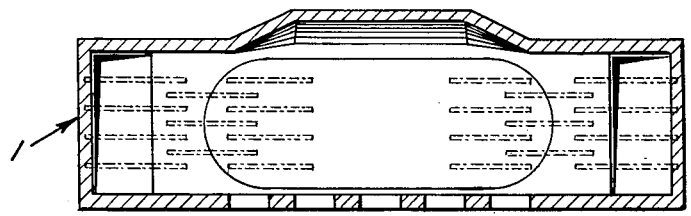
FIGURES 2 and 3 are corresponding cross-sectional and horizontal sectional views respectively.

FIGURES 1 to 5 show a large open-hearth furnace having five doors generally indicated by the reference character 1. It is provided with a plurality of elongated burners 2 which extend through its roof into the interior of the furnace whose charge-chamber corresponds to that of conventional furnaces. However, the ends of the furnace have been materially modified. In the presently-described embodiment, they are gently curved at their upper part at 3 so as to progressively deviate and direct toward the roof, the flow of hot air coming from the regenerator, instead of directing it toward the charge of material to be treated 4 as in conventional furnaces. Further, in plan, the end of the furnace gently diverges toward the lateral wall of the furnace so as to permit a sheet of air to flow along this wall instead of causing the streams of air to converge toward the axial part of the furnace. There is thus formed a sheet of air which flows along the uprights and the roof from one end to the other of the furnace, this air cooling these parts and protecting them against the destructive action of the flames.

The burners 2 are disposed symmetrically relative to the transverse median plane of the furnace with outlets at their respective inner discharge ends. These burners have a small diameter, are of any known type, are disposed in staggered relation and form, in the presently-described embodiment, on each side of said transverse median plane three rows of burners extending transversely of the longitudinal axis of the furnace. The position of each row is so chosen that at each charging door there is a corresponding row of burners. Thus, each of the mounds formed in front of the charging doors by the material before it melts (FIGURES 4 and 5), is positioned just in the path of the flames of the burners of the same transverse row. The flames of the burners can therefore fully develop in the free spaces between these mounds and act on the latter with maximum effect. The thermal exchange between the flames and the charges is considerably improved over that obtained with conventional devices constituted by one or two burners disposed in each end of the furnace and directed toward the opposite end. Moreover, there is no longer danger of relighting under the roof and overheating of the bricks of the roof and the uprights is avoided.

Thus, the total heating requirement is broken down by the use of multiple forward firing burners 2 into a plurality of smaller individual flames with relatively more uniform heating, more effective control, greater economy and more efficient heat transfer between the tips of the flames and the material being heated. Still further, the furnace roof is protected with the flames smaller, rather abruptly directed away from the roof and at a selected significant distance therefrom. Such benefits are obtainable under this invention whether heating is provided during a melting phase on mounds of material to be melted or during a heating, treating or refining phase with the burner flames impinging on the surface of a pool of melted steel or other material, the distance and fuel rate being respective and selective for the desired results.

From one row to the other, and in the direction from the input end to the output end of the furnace, the burners 2 situated on the same side of the transverse median plane extend into the interior of the furnace to decreasing extents. Thus each row of burners is supplied with air in a distinct layer or level of the sheet of air flowing along the roof, which layer is undisturbed by the burners of the preceding row; this advantageous effect of offsetting or vertically spacing the burners is furthermore combined with that of the staggering of the burners in plan.

In the embodiment shown in FIGURES 6 and 7 of support means for the heating means permitting their displacement and orientation, each heating means 2 is of the type carried by a member 9 which permits regulating it separately in direction and longitudinally relative to the furnace. The members 9 which support the heating means 2 of the same row are fixed to a horizontal common cross-member 10 which extends above the furnace transversely of the latter and is itself fixed at its mid-part to a carriage 11 capable of moving along a guide 12 which is held above the furnace and forms a runway for this carriage. In the presently-described embodiment, this guide 12 is constituted by a girder-disposed in a longitudinal plane of the furnace, the carriage 11 resting on the flanges of this girder through the medium of rollers 14. Connected to this carriage is the end of a cable 15, or like connecting means, which passes around a pulley 16 carried by the girder 12, the other end of this cable 15 being connected to a winch 17 which is driven for example by an electric motor 18. The winch and the cable are supported by a structure 19 outside the furnace. It can be seen that when the winch driven by the motor 18 rotates, it moves the carriage 11 along the guide 12 and thus moves each of the heating means 2 carried by the corresponding member 10. Each of these means 2 is moved obliquely downwardly and vice versa so that the heating means 2 are moved toward or away from the charge in the furnace ranging between position superjacent the hearth and further therefrom. To allow these movements, the fluids necessary for operation of each heating means, which in the presently-described embodiment are burners, that is, the fuel, the atomizing agent, oxygen and water (inlet and outlet) are supplied to each burner by way of flexible pipes 21, 22, 23, 24 and 25 connecting each burner to supply piping for these fluids.

The inclined guides 12 are pivoted at their lower parts to a support 26 carried by the structure or frame 27 of the furnace, so as to be pivotable about a horizontal axis extending transversely of the furnace. Fixed to the upper part of each of the guides 12 is a cross-member 28 to the ends of which are pivoted the ends of bars 29 whose other ends are fixed to the structure 27 for one of the sets of bars, and to the structure 19 for the other set by means of a rod which may be introduced at will into any one of a number of holes spaced along these bars 29. Thus, it can be seen that in changing the hole for the corresponding rod, it is possible to angularly shift each guide 12 independently about its lower pivot, and with this guide the whole of the unit supported thereby comprising the carriage 11, the member 10 and the row of heating means 2 carried by the latter, so that the orientation of each of these heating means in the corresponding longitudinal plane of the furnace can be varied.

It will be understood that the electrical cables necessary for operation of the burners are enclosed in flexible sheaths.

The shape of the furnace in FIGURES 6 and 7 is only approximately streamlined to facilitate its construction, the roof having inside the furnace a shape comprising inverted steps 33, 34. The air supply passageway 35 is upwardly inclined toward the centre of the furnace and so constructed as to result in a calm and regular flow of the air toward the zones of the burners in the roof. It may be constructed either of unhooked flat roofs or of a wall which is anchored or suspended. Each step comprises a horizontal part 36, 37 arcuate in the transverse direction (FIGURE 7) and a vertical part 38, 39, the vertical part between two successive steps being common thereto. In these vertical parts 38, 39 there are provided oblique passageways allowing the burners to extend into the furnace, these passageways having such cross-section and shape as to permit moving and orientating the burners or other heating means.

The modification shown in FIGURE 8 differs from the preceding embodiment, in particular in that the structure that supports the motor-winch unit 17a, 18a of the burner shifting carriage 11a which rolls along the guide 12a comprises a horizontal plate 41 which is vertically movable along four vertical guiding slideways 42. This plate rests on the movable shaft of a jack 43 which, in the presently-described embodiment, is in the form of a manually-operated jack and which could of course be motor driven. The bars 29a controlling the inclination of the guide 12a are pivoted at their lower ends to the plate 41 so that vertical movement imparted to the latter by the jack 43 varies the inclination of the guide 12a. Another difference, which may be incorporated independently of the last-mentioned difference, is the fact that the pivotal connection of the guide 12a at its lower part is not supported by the structure of the furnace as such as shown in FIGURE 6, but by the lower end of a vertical rod 45 fixed to a girder 46 extending over the furnace. Furthermore, the streamlined roof 47 of the furnace comprises at the point where each heating means extends into the furnace, a refractory element 48 in which is provided a throughway aperture for the passage of said heating means, the ends of this aperture being flared so as to permit adjustment in the inclination of the heating means.

In the two embodiments described hereinbefore, movement of the carriages 11, 11a along the guides 12, 12a does not bring about variation in the inclination of the heating means 2, this variation being obtained independently. If a curvilinear guide is used instead of a rectilinear guide, it could be arranged that the movement of the carriage along the guides results in variation in the inclination of the heating means carried thereby, this inclination depending on the curvature of the guides. This curvature could vary from one point of the guide to another.

In the embodiment shown in FIGURE 9 of the automatic control of the movement of the heating means, the means for varying the inclination of the heating means have not been shown for the sake of simplicity, but it is obvious that these means could be provided and could be, for example, of any one of the previously-described types or any other type.

In this embodiment, the electrical motor 18b which drives the winch 17b shifting the carriage 11b carrying a row of heating means, is reversible and is supplied with current through the medium of two contactors in the housing 51, one being provided for each direction of rotation. The excitation of these two contactors is controlled by an indicator 52 or responsive means of known type having two contacts which are separated from one another by a portion of adjustable width and are connected by conductors 53 to a distance detecting apparatus 54 so connected to the carriage 11b as to move therewith. This detecting appartaus may be of any known type utilizing for example ultrasonic impulses, or rays. It is directed onto the charge inside the furnace through a passageway 55 formed in the roof. According as the distance between the detecting apparatus 54 and the charge, and in consequence the distance between the heating means and this charge, is greater than the predetermined upper limit or less than the lower limit, one or the other of the two contacts of the indicator 52 is closed, the corresponding contactor in the housing 51 is excited, and the motor 18b supplied with power for rotation in the appropriate direction through the medium of the winch 17b moves the carriage 11b in such manner as to bring said distance between the two predetermined upper and lower limits. To avoid any possible repetitive operation, a time switch 56 could be advantageously interposed in the supply circuit of the housing 51 so that the automatic control is discontinuous.

The automatic control device just described could be modified by replacing the distance detector 54 by a detector of the temperature of the charge, for example an optical pyrometer. In this case, the shifting mechanism for the carriage 11b is such that, once started up, it moves the carriage only a small distance and automatically stops. To this end, it comprises, for example, a known stopping device for the electric motor 18b which stops the latter after a predetermined number of revolutions, or any other like device could be used. This modified arrangement operates in the following manner: the time switch 56 is so adapted that each of its closures only lasts a short period of time, for example about one or several seconds, whereas the intervals of time between the successive closures are, for example, about one to two minutes. If during one of these closures the temperature of the charge departs from a predetermined value, a small displacement of the carriage occurs; if this displacement is sufficient to correct the temperature difference, no other displacement occurs during the following closure of the switch 56; in the opposite case, if the correcting action is insufficient, a further small displacement occurs and this procedure is repeated indefinitely.

Figure 10:
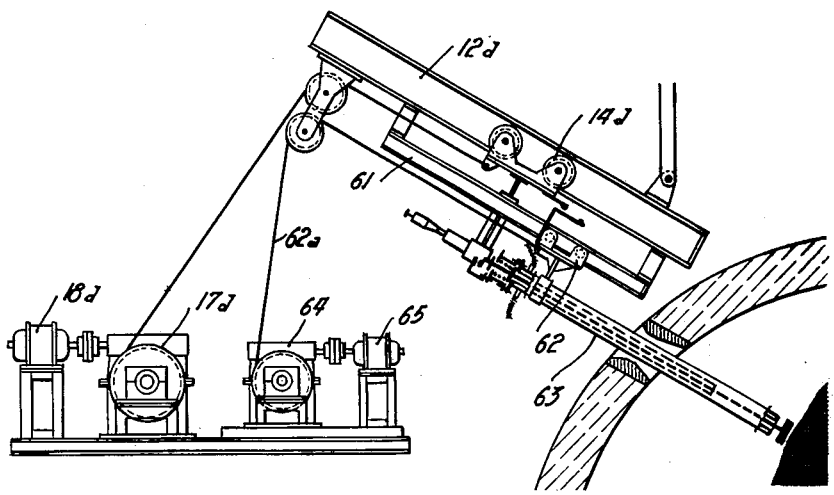
Figure 11:
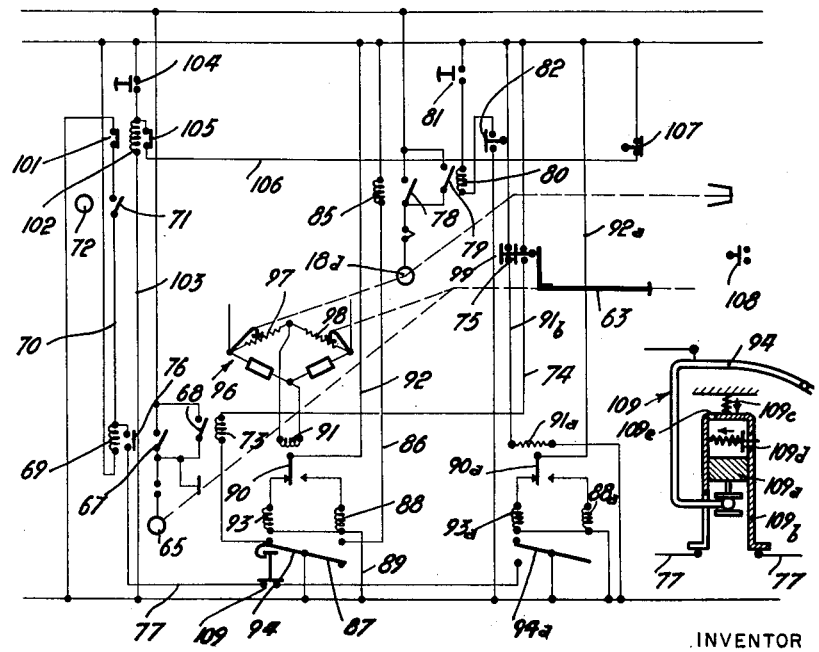

In the embodiment of the automatic control device shown in FIGURES 10 and 11, the guide 12d of the carriage 11b carrying the row of heating means supports an auxiliary guide 61 along which is movable an auxiliary carriage 62 carrying a detecting feeler or probe 63 which extends into the furnace. This auxiliary carriage 62 is connected by a cable 62a to an actuating winch 64 driven by an electric motor 65. Power is supplied to the latter, which shifts the feeler, through the medium of two contactors 67, 68 connected in parallel in its supply circuit. The contactor 67 whose closure causes the motor 65 to rotate in the direction corresponding to a forward movement of the feeler 63 toward the charge in the furnace, has its excitation coil 69 inserted in a circuit 70 comprising a switch 71 controlled by electric time measure 72 or the like. The contactor 68, corresponding to the return movement of the feeler 63, has its coil 73 inserted in a circuit 74 comprising an end of return travel switch 75 of the feeler 63. The contactor 67, 69 has its self-exciting contact 76 inserted in a circuit 77. Power is supplied to the motor 18d, moving the heating means, also through the medium of two contactors 78, 79 connected in parallel in the supply circuit. The contactor 79, whose closure corresponds to rotation of the motor 18b causing the heating means to be moved away from the charge, has its coil 80 inserted in an excitation circuit further comprising a hand switch 81 and an end of return travel switch 82 of the heating means. The contactor 78, whose closure corresponds to a movement of the heating means toward the charge, has its coil 85 inserted in a circuit 86 comprising a switch 87 controlled by a relay 88 whose excitation circuit 89 comprises a reversing switch 90. In its normal inoperative position, that is, when its control coil 91 is not excited, the switch 90 closes a circuit 92 in which is inserted a coil 93 actuating a switch 94 which is connected to the switch 87 in such manner that when the switch 87 is open the switch 94, inserted in the circuit 74, closes this circuit, whereas when the switch 87 is closed, the switch 94 opens the circuit 74. The coil 91 of the reversing switch 90 is connected to a balance bridge generally indicated by the reference character 96. The slider of the potentiometer 97 of this bridge is so connected to the mechanism moving the heating means as to be displaced as a function of the displacement of the latter, preferably in a manner proportional to this displacement. The slider of the other potentiometer 98 of the bridge is connected to the feeler 63 by a connection which is operative in only one direction and has a lost motion so that the feeler can drive this slider when the feeler moves inwardly of the furnace but cannot return it rearwardly. Further, the circuit 70 comprises a contactor 101 whose coil 102 is inserted in a circuit 103 comprising a manually-operated push-button 104. The coil 102 actuates moreover, a switch 105 in a circuit 106 comprising an end of travel switch 107 which is disposed in such manner as to be opened by the heating means or the driving mechanism for the latter when they reach their extreme forward position inside the furnace. Another end of travel switch 108 is disposed in the path of the feeler 63 in such manner as to be closed by the latter when it reaches a predetermined extreme position in its movement inwardly of the furnace; the connections of this switch 108 have not been shown in the drawing for reasons of simplicity. The self-exciting circuit 77 of the contactor 69 and 67 further comprises a biased relay generally indicated by the reference character 109. This relay comprises a small dash-pot whose piston 109a is connected to the switch 94 in such manner as to be moved by the latter both upon the opening and closure of this switch. The cylinder 109b of the dash-pot is movable and carries contacts closing the self-exciting circuit 77, and a weak spring 109c urges this cylinder toward its position corresponding to closure of this circuit. This circuit 77 also comprises another switch 94a whose opening and closure are respectively controlled by two coils 93a and 88a connected in parallel, with interposition of a reversing switch 90a, in the circuit 92a. The switch 90a is actuated by a coil 91a placed in a circuit 91b comprising a contact 99 which is connected to the end of travel contact 75 so as to be opened and closed at the same time as the latter. The reversing switch 90a is so adapted that when the coil 91a is not excited, it closes the circuit of the coil 93a and thus maintains the switch 94a open.

The furnace operates in the following manner:

At the start of the process, when the furnace has just been charged, the heating means and the feeler 63 are in their position of maximum withdrawal relative to the furnace. The end of travel switches 82 and 75 are therefore open and the switches 107 and 108 are closed. Further, in this position, the distance between the nose of the feeler 63 and the ends or the heads of the heating means is equal to that which must exist between these ends of the heating means and the charge, and the electrical bridge 96 is balanced. The manual closure of the general switch 104 supplies current to the coil 102, and the contact 101 and 105, actuated by this coil, are closed. When the push-button switch 104 is released or opened, this coil 102 is nevertheless supplied with current through the conductors 106 and 103 and through the contact 105, which is closed. When the electrical time measurer 72 temporarily closes its contact 71, the current passes through the circuit 70 in the coil 69 and the contacts 76 and 67 are closed and the motor 65 is supplied with current so as to rotate in the direction corresponding to movement of the feeler 63 inwardly of the furnace. As soon as it starts to move, the feeler 63 drives the slider of the potentiometer 98, the bridge 96 is no longer balanced, current enters the coil 91 which operates the switch 90. The latter closes the circuit of the relay 88 and this relay actuates the switch 87 which closes the circuits 86, and the switch 94, actuated at the same time, opens the circuit 74. As soon as the feeler has started to move, the end of travel switch 75 is closed, but the circuit 74 has been opened due to the opening of the switch 94. Further, closure of the switch 75 caused closure of the contact 99 and therefore closure of the circuit 91b and the supply of current to the coil 91a. The reversing switch 90a then closes the circuit of the coil 88a which actuates the switch 94a and causes closure of the self-exciting circuit 77 of the contact 67, 69. The closure of the circuit 86 supplies the coil 85 with current which actuates the switch 78 and the latter closes and thus supplies to the motor 18d power in such manner as to cause it to rotate in the direction corresponding to inward movement of the heating means driven thereby into the furnace, that is, movement of these heating means toward the charge. At the same time, the slider of the potentiometer 97 has imparted thereto a movement related to that of the heating means in accordance with the same law as that which relates the movement of the slider of the potentiometer 98 to the forward movement of the feeler 63. When the latter encounters the charge, a sliding coupling interposed in its connection with the motor 65 permits continued rotation of the latter. The heating means and the slider of the potentiometer 97 continue their movement until the balance of the bridge is re-established. At this moment, the reversing switch 90 opens the circuit 92 supplying the coil 88 and again closes the circuit 92 supplying the coil 93, whereas the switch 87 opens the circuit 86. As the contactor 78, 85 is no longer excited, the motor 18d stops and the ends of the heating means are at a distance from the end of the feeler 53 which is equal to the original distance, that is, they are once more disposed at a suitable distance from the charge. Excitation of the coil 93 returns the switch 94 to its initial position and closes the circuit 74. In its movement, the switch 94 drives with it the piston 109a of the dashpot. In moving, the cylinder 109b opens the circuit 77 of the contactor 67, 69 which opens but the closure of the circuit 74 by the switch 94 supplies current to the contactor 68, 73 whose contact 68 closes and supplies power to the motor 65 in such manner as to cause it to rotate in the direction corresponding to the return or withdrawal of the feeler 63. The latter therefore moves rearwardly, but without driving the slider of the potentiometer 98 so as not to disturb the balance of the bridge 96, until it encounters the end of return travel switch 75, which opens the circuit 74 and causes the contact 68 to open and thereby cut off the supply to the motor 65. Simultaneously the contact 99 connected to the switch 75 is opened, the circuit 91b is thereby opened, the coil 91a is no longer excited, the reversing switch 90a opens the circuit of the coil 88a and closes that of the coil 93a which, as it is excited, actuates the switch 94a which opens the circuit 77 of the contactor 67, 69. During this time, the cylinder 109b of the time relay slowly moves downwardly owing to the action of the spring 109c, the return of the cylinder to its position corresponding to closure of the contact inserted in the circuit 77 being retarded by the air which escapes slowly from said cylinder by way of the small orifice 109e. The circuit 77 however, remains open, since the switch 94a has been opened in the meantime. The time relay 109 is so arranged that the time required for the return of the cylinder 109b is sufficiently long for the feeler 63 to return to its initial position and open the contact 79. In other words, the relay 109 must be so regulated, that the time it takes to close itself is longer than the time taken by the feeler 63 to move rearwardly to the end of its rearward travel. Further, the time measurer 72 is so arranged that the interval of time between two successive closures of the contact 71 is longer than the total time taken by the feeler to effect its maximum travel in both directions added to the time elapsed between opening of the switch 94a and the return to the position of contact of the time relay 109.

Upon subsequent closure by the time measurer 72 of its contact 71, the above-described series of operations occurs, except that the movement of the feeler 63 does not bring about immediately the conjoint displacement of the slider of the potentiometer 98 and therefore does not cause the bridge 96 to be put out of balance, until the feeler 63 has returned to the position in which it had stopped in the preceding operation; at this moment, the feeler 63 once more drives the slider of the potentiometer 98 until it is once more in contact with the charge and the previously-described procedure is repeated.

When the heating means reach their extreme inward position inside the furnace, the end of travel contact 107 opens and the circuit 106 is opened and ceases to supply current to the coil 102, so that the whole of the automatic control device is put out of circuit until a further closure of the general switch 104. Meanwhile, the heating means have been returned to their initial extreme rearward position by depressing the push-button 81 which closed the circuit of the coil 80 and caused closure of the switch 79 which supplies power to the motor 18d in such manner as to cause it to rotate in the direction corresponding to the return of the heating means, the return travel of the latter continuing until the opening of the end of travel switch 82, which cuts off the supply of the coil 80 and causes the switch 79 to open.

Figure 16:
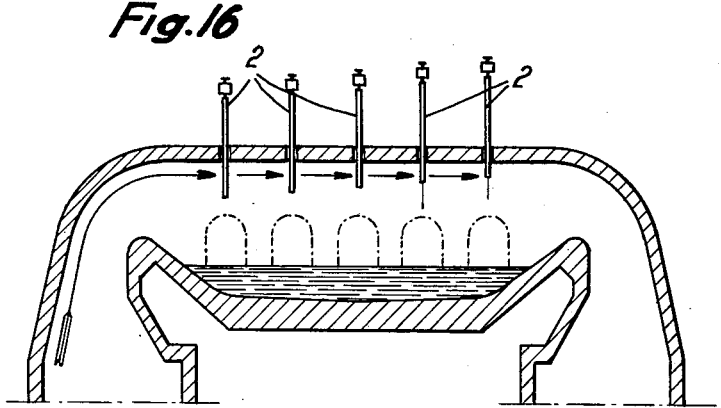

With the burners disposed as shown in FIGURES 1 to 5, only those situated on the same side of the transverse median plane of the furnace, that is, the side adjacent the end of the furnace through which the hot air is supplied, can be used together to fullest advantage, the other half of the burners being used during reverse operation of the furnace. But it is also possible to use all the burners simultaneously by suitably orientating and vertically offsetting them as shown in FIGURES 16 and 17, their offset relationship and their orientation being reversed during reverse operation of the furnace. However, with the arrangement as shown in FIGURES 1 to 5, the row of burners situated nearest the outlet end of the furnace in each case cannot be used to fullest advantage; it would therefore be preferable in such case to place this row of burners on each end a little further away from the fire-bridge toward the interior of the furnace.

Figure 12:
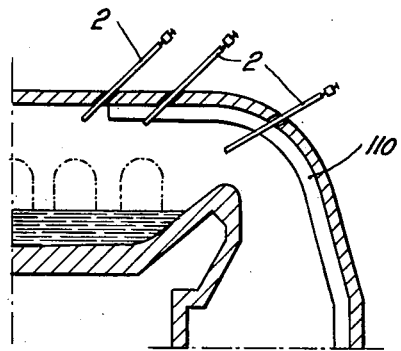
FIGURES 12 and 13 are longitudinal sectional and cross-sectional views respectively of a furnace whose roof is provided with means adapted to improve the supply of air to the burners as a gaseous layer or sheet protecting the masonry of the furnace.
Figure 13:
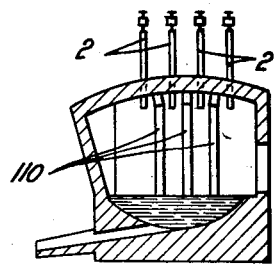

FIGURES 12 and 13 show the provision under the roof of longitudinal partitions or screens 110 which extend between each longitudinal column of burners up to those situated nearest the output side of the furnace and define pasageways or ducts for directing air toward the last mentioned burners, thereby contributing to the avoidance of disturbed zones and thus ensuring a good air supply to the most remote burners each of which has its own air supply passageway.

Figure 14:
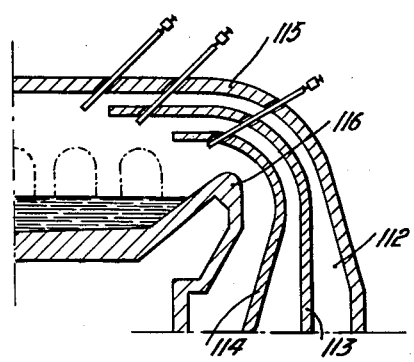
FIGURES 14 and 15 are views similar to FIGURES 12 and 13 respectively of respective modifications of said means improving the supply of air to the burners by the gaseous sheet protecting the masonry.

In FIGURE 14, the air supply passageway 112 at each furnace end is subdivided into three passageways by two transverse screens 113, 114 which extend a certain distance inside the furnace in the form of superimposed roofs or arches. The arched or curved part of the screen 113 which is the nearest to the outer roof 115 of the furnace terminates at a point somewhat inwardly of the heating means situated nearest the adjacent side of the furnace, and the immediately adjacent burners in the direction of the other side, the latter burners extending through this arched part of the screen 113 and being therefore supplied with the fluid entering to the passageway between the screens 113 and 114; whereas the heating means situated nearest that other side of the furnace are supplied with fluid through the passageway between the screen 113 and the outer roof 115. The screen 114, which is the nearest to the wall of the firebridge 116, has its arched or curved part, which terminates between the burners nearest to nearer side of the furnace and those immediately adjacent in the direction of the other side of the furnace, penetrated by these burners nearest the nearer side so that they are supplied by the sheet of fluid circulating between the firebridge 116 and the neighbouring screen 114.

Figure 15:
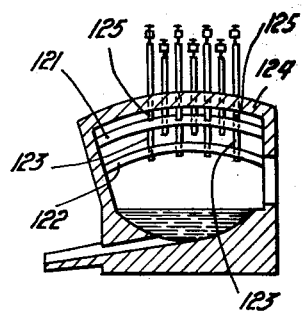

FIGURE 15 shows a furnace comprising the combination of screening by means of plural roofs similar to that just described with reference to FIGURE 14 with further screening by means of longitudinal screens of the type shown in FIGURES 12 and 13. Reference characters 121 and 122 designate the screening roofs in FIGURE 15 and 123 the four longitudinal partition screens extending between the roofs 121 and 122 and thus defining three passageways therebetween into which extends respectively one of the heating means of the intermediate row situated between the row nearest the inlet side of the furnace and that nearest the outlet side of the furnace.

Further, between the outer roof 124 and the roof 121 there are four longitudinal partition screens 125 which define therebetween and with the adjacent roofs, three passageways into which extend respectively the ends of the heating means of the row nearest the far side of the furnace which heating means are contained in the same longitudinal plane as the immediately adjacent heating means in the direction of the near side of the furnace. The heating means of the row nearest the near side of the furnace communicate with the underside of the screening roof 122 which does not have therebelow a longitudinal screening. The heating means of this last row are, in the presently-described embodiment, four in number and are disposed in staggered relation relative to those of the other rows each of which comprises three heating means. In this type of furnace, each of the heating means, except those of the row nearest the nearer side of the furnace, is therefore supplied with gaseous comburent material or agent through a passageway corresponding thereto.

This separate supply of gaseous comburent material to each heating means is developed to the maximum extent in the type of furnace shown in FIGURES 18 and 19. In this type of furnace, there is no fire-bridge wall and the gaseous comburent material is fed to each burner through the roof of the furnace by way of a separate pipe 128 situated outside the furnace. All these pipes 128, which are downwardly curved, are united at their base by a crescent-shaped manifold plate 129 which surrounds the outer face of the end of the furnace and covers the upper downwardly flared crescent-shaped end of a gaseous comburent agent manifold supply pipe 130. A register or like means may be provided at the base of each pipe 128 so as to regulate separately in respect to each pipe the amount of gaseous comburent material which passes through to the heating means fed by such pipe. It will be obvious that a furnace of such type may be provided with all the means disclosed herein for manually or automatically shifting the heating means.

Irrespective of the type of furnace, it is usually advantageous to equip it with means indicating the position of the heating means, and FIGURES 20 to 22 show two embodiments of these indicators. FIGURE 20 shows indicators which comprise an indicating arm 131 which is fixed to a transverse shaft 132, carrying at least one heating means, and is disposed so as to be parallel with said heating means and has its lower end in the same plane parallel to the shaft 132 as that of the heating means. This arm 131 therefore participates in the movements of the shaft 132 and in consequence in the movements and changes in orientation of the corresponding heating means and therefore always indicates the exact position of the latter.

In the modification shown in FIGURES 21 and 22, the indicating arm is replaced by a luminous area which is elongated in the vertical direction and narrow the horizontal direction and is formed on the wall of the furnace by a light beam 133 issuing from a light source 134 carried by a rack 135 which is vertically movable in a guide 136 and is in mesh with a pinion 137 meshed with another gear 138 keyed on the shaft of a pulley having the same diameter as these gears and around which is passed a cable 140 held taut by a counterweight 141 the other end of this cable passing around a pulley 142 and being attached to the end of the transverse shaft 132a carrying the heating means. The assembly is so arranged that the lower edge of the luminous area formed on the wall of the furnace is at the same level as the lower end of the heating means. It is clear that this lower edge moves with the shaft 132a a distance equivalent to the movement of the latter so that it always indicates the level of the end of the burner or burners.

Alternatively, the movable light source could be replaced by a closing member or shutter which intercepts the lower part of the light beam issuing from a fixed light source, the lower edge of the luminous area indicating the level of the heating means being determined by the edge of this shutter which moves with these heating means, for example due to the fact that it is connected thereto in the same way as the light source shown in FIGURE 21.

All the automatic control devices of a furnace irrespective of its type may be made subordinate to the control of the operation of the charging doors of the furnace so as to become operative through such subordinating connection only when the doors are open; thus, the opening of one or more doors producing firstly the return of the heating means to their extreme retracted position followed by the opening of the circuit of the automatic control devices therefor, the closure of this current being produced by the closure of the doors of the furnace. This may be obtained by means of an electrical or mechanical connection between these doors and the automatic control devices, for example, by means of push-buttons 107, 81 and 104 (FIGURE 11).

FIGURES 23 to 26 show two panels, each generally indicated by the reference character 151, which constitute by their juxtaposed relationship the roof of the furnace. Each of these panels extends across the entire width and across half the length of the furnace. They are fitted in the upper rectangular opening of the furnace 152 in a vertically movable manner. Each panel comprises a rigid metal frame 153 the sides of which are upstanding, which imparts to the panel the appearance of a flat tray, the base of the panel being subdivided into a plurality of compartments by transverse partitions 154. These metal frames 153 support refractory linings 155 each of which is attached to the corresponding frame in the manner of the suspended roof elements or anchored wall elements of known type. The upstanding sides of the frames are also provided with such linings. In each compartment of the base of a frame, this refractory lining comprises an aperture through which extends a burner 156. In the presently-described embodiment, there exists on each frame five longitudinally spaced rows each comprising four burners spaced apart transversely of the furnace. Associated with each panel 151, is a raising device 157 disposed at the side of the furnace and comprising an arm 158 to which is fixed, through the medium of box-like structures 159, the frame 153 of this panel. In the presently-described embodiment, each raising device 157 is in the form of a vertical jack whose base is fixed to the ground through the medium of a pivot 160, the movable member 161 of this jack being disposed at the upper part and carrying the arm 158. The jack, which in the presently-described embodiment comprises a rack but which could be of any other type, is actuated for vertical motion by a reversible motor 162 and a speed reducer carried by the rotatable column 163 of the raising device. A motor 164 fixed to the ground actuates the jack as concerns pivotal motion. Each raising device constitutes a support for pipes which comprise fixed and flexible portions and permit all the downward and upward and rotational movements of the arm 158 and supply fuel and comburent material to all the burners of the panel.

The motor 162 is controlled either manually by the operator or automatically in the manner described hereinbefore in respect to the motor operating the automatic displacement of a group of burners, which group, in the presently-described embodiment, is replaced by a suspended roof panel.

It should be noted that all or only some of the burners of the same panel could be mounted in such manner as to be adjustable in position manually or by means of a manually or automatically operated control device, relative to the frame which supports them and in particular to be orientable either separately or in unison in the manner described hereinbefore in respect of the heating means extending through a fixed roof.

It will be observed that in the described arrangement there is formed on the inner side of each charging door 165 a row of burners spaced apart from one another transversely of the furnace so that their flame can develop with maximum intensity as soon as heating commences, in the recessed parts between two heaps of material to be melted formed in front of two successive charging doors, which still more increases the speed of melting.

When the furnace is in operation, the raising device is actuated manually or automatically so that the roof panel corresponding to the end of the furnace in operation is lowered with the burners carried thereby as melting progresses. An important advantage is that a decrease in the volume of the interior of the furnace results so that the volume of combustion considered necessary for the development of the flame or for the required diffusion of heat, is maintained at a constant value which results in the obtainment of the highest temperature for the operational conditions of the moment imposed by the state of the charge.

With reversing furnace operations, the roof panel whose burners are inoperative is raised, to the extent necessary to ensure, in moving it away, less thermal stress in this panel, which is no longer protected by the air of combustion supplied to the burners when in operation. Toward the end of the melting operation and when heating the liquified mass, operation could proceed with the two roof panels in lowered position in the furnace, if desired, one of the panels being lower than the other depending on which end of the furnace is in operation.

Figure 4:
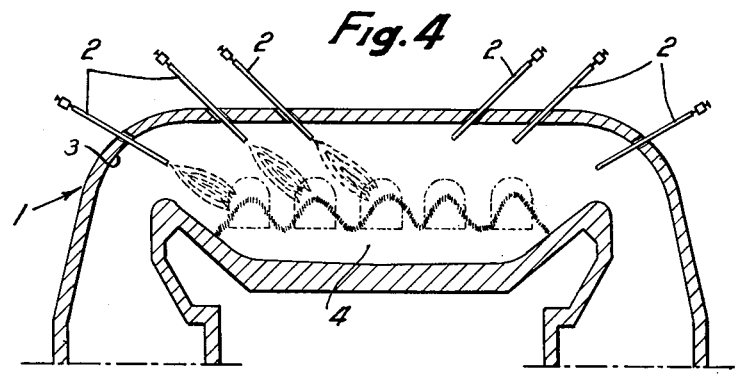
FIGURE 4 is a view similar to FIGURE 1, the charge in the furnace being still in its solid state and one of the heads of the furnace being in action to heat and melt this charge.
Figure 2:
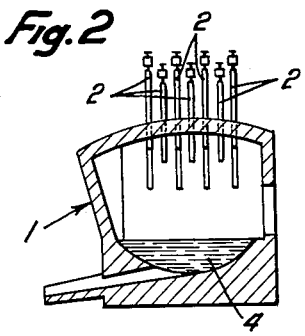
Figure 5:
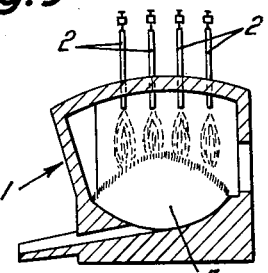
FIGURE 5 is a corresponding cross-sectional view similar to FIGURE 2.

During charging of the furnace the described arrangement affords the big advantage, as compared with FIGURE 4, of permitting the upper opening of the furnace to be rendered completely free of obstructions by moving the roof panel away from this opening by means of the raising device and bringing this panel to a position at the side of the furnace by swinging the arm 158. Thus, the furnace can be charged vertically from above by means of a large capacity bucket 166 which considerably reduces the usual time taken for charging such a furnace.

In another embodiment of the furnace of the invention shown in FIGURE 27, the furnace unit 170 with its hearth is vertically movable by means of hydraulic jacks or rams 171 on which it rests. Slidable couplings 172 connect the ends of the furnace to the passageways 173 supplying the air of combustion. The relative vertical displacement between the hearth of the furnace and the burners 174 is thus obtained by moving the furnace by means of the rams, the latter constituting the means whereby the furnace is displaced. The burners 174 and the roof could be fixed, in which case the furnace would comprise lateral charging doors similar to conventional furnaces, but it is advantageous to construct the roof in the form of two panels 175 each of which is suspended from an arm 176 which is so arranged as to be pivotable in the manner of the arm 158 (FIGURES 25 and 26) or to be withdrawable to one side of the furnace in any other manner so as to leave the upper part of the furnace free of obstructions and permit the furnace to be charged from above as shown in FIGURE 26. Instead of being composed of two panels 175, the roof could comprise a greater number of panels or only one panel. Whether the roof is fixed or movable, the burners 174 in the presently-described embodiment are carried by the panels 175 and are unitary with the latter so as to participate in the movements of these panels. These burners could be carried, as described hereinbefore in respect to the furnaces having a fixed roof and movable burners, or in the manner described hereinbefore in respect to the embodiment shown in FIGURES 22 to 26.

Likewise, operation of the rams could be controlled manually or automatically by devices similar to those described for controlling the movement of the movable burners, the supply of fluid under pressure to the rams replacing the supply of electric current to the electric motors.

In the foregoing embodiments, there may be any number of rows of burners and any number of burners per row, the number being determined by the size of the furnace and the sizes of the burners utilized. Any heating means other than burners could be used. The means for moving the burners could be purely mechanical or electrical or driven by liquid or gaseous fluid under pressure. The means suspending the movable roof panels could also be different from those described hereinbefore and comprise instead, for example, means for counterbalancing the suspended panel.

FIGURES 28 to 35 inclusive of the drawings illustrate a presently preferred furnace embodiment of my invention in the form of an open hearth steel-making furnace. Furnace 200 comprises a refractory lined hearth 201 and combustion air passages 202 at the respective ends of the furnace leading to the furnace interior from the checker chambers for the preheating of combustion air, a refractory roof 203 arched from front to rear and structural steel girding 204 for the furnace, and movable burner mechanisms 205 for the right and left halves of furnace 200. The furnace is usually charged with hot metal, scrap, or both, through openings 206 along the front of the furnace, which openings are normally closed by vertically movable doors 207, of which there are three such openings and doors in the illustrated furnace. Suitable tap holes are provided in the back of the furnace to draw off metal and slag respectively from the pool on hearth 201 at the end of a heat, following the completion of the melting of any solid material initially present and of the refining phases of the open hearth operation. The thermal needs of the furnace are selectively provided for by one or more of the two burner assemblies 205 operable to provide for an adjusted distance or distances between such burners and the hearth and/or for a selective fuel input rate or rates to the burners respectively in each set, or to the burners in both of the assemblies 205. Furnace 200 as shown is a reversing, regenerative furnace combination of this invention.

Each of the burner set mechanisms 205 comprises a wheeled carriage 208 having a horizontal lower burner platform 209 and a horizontal upper pipe stand 210 clamped to carriage 208 to supply burners 211 with fluids as hereinbelow further described. Each carriage 208 is confined to travel along an inclined runway 212, the lower end 213 of each of which is pivotally supported by cross girding members of the frame 204 for the furnace. Runway 212 is provided with channels 213a to each side thereof with the flanges facing outwardly and providing guides for wheels 214 on the inner side of the sides 215 of open-ended box carriage 208. A double grooved pulley 216 is journaled between channels 213 at the upper end of runway 212 to support a pair of cables 217, the respective inward ends of which are anchored to bar 218 of carriage 208 so that as the cables 217 are moved, carriage 208 will correspondingly move along runway 212 and correspondingly move burners 211 toward and away from hearth 201, as the case may be.

Roof 203 is provided on each half with port blocks 219 therein with aligned port passages 220 therethrough for the respective burners 211 on that side, each of which burners may be constructed in accordance with the one illustrated in longitudinal section in FIGURE 36. Considerable clearance may be provided around the sides of each port opening 220 relative to the outside of the barrel of the burner 211 passing therethrough, to allow for any desired orientation about the axis of rotation of support 221 which may be a circular flange with arcuate slots therein to be bolted in the selected adjusted position to a boss on a depending support 222 fixed to platform 209. Generally, ambient air around the furnace will be drawn into the interior furnace space through the port clearance by the firing action of the burners which may help to keep the furnace roof, generally the most vulnerable refractory surface in such a furnace, cool, or blower rings may be provided to supply some air to the furnace through such port openings 220 around the outside of barrels of burners 211, as and when desired.

Support 221 has a clamp 223 attached thereto with spaced walls 224 each provided with a V-notch for the barrel of a burner 211. A pivoted holddown 225 holds the barrel fixed against the sides of the notches, the holddown having a slot to receive a wedge 226 to lock the holddown against a stationary portion of clamp 223. In each movable burner mechanism 205, there are six burners arranged in four longitudinally spaced rows and staggered in plan. The first and third rows counting from the outside of each mechanism 205 relative to an end of the furnace, has a pair of burners therein spaced symmetrically to each side of the center line of runway 212 while the second and fourth rows have a single burner 211 in central position relative to the longitudinal center line of runway 212 and carriage 208. Burner 211 in the second row has the upper end thereof hidden by the carriage, when viewed in plan.

As each carriage 208 ascends toward the upper end of its runway 212, the burners 211 associated therewith will be withdrawn and the distance increased between the lower discharge ends of the burners and the hearth. Conversely, when carriage 208 is at the bottom of its respective runway 212, its burners 211 will be in the position illustrated in FIGURE 28. Normally, in a regenerative open hearth furnace operation, when the left hand assembly 205 in the position shown, with preheated combustion air rising in the left hand passage 202, the right hand assembly 205, as viewed in FIGURE 28, would be retracted and the discharge ends of the right hand burners 211 will be at their farthest distance from hearth 201. Further, although both burner mechanisms 205 are illustrated in their extreme extended (bottommost) position in FIGURE 28, it will be recognized that the distance between the discharge ends of the respective burners in each asesmbly will be correlated with the desired distance from the hearth for the service to be performed and the selected fuel input rates for the burners and, still further, with either assembly which may be firing at the time being. Further, in the event of a charge of, for example, scrap, limestone, or ore to be melted, the impingement of the tips of the flames issuing from the firing burners may be maintained as the surface of the respective solid charge heats and subsides toward the hearth 201, by having the respective burners follow the surface of such charge being melted. Moreover, in such a melting phase of a heat, if there are mounds of solid material to be melted in both halves of the furnace, then all of the burners in both assemblies 205 may be so utilized and operated to hasten the melting of the solids by keeping the surfaces thereof within the zone of maximum heating action of the respective flames. Moreover, the entire burden on the hearth is virtually in molten condition, the burner assemblies can be returned to normal alternating operation and the distance between the set of burners in action selectively adjusted for its optimum distance from the surface of the pool on the hearth. It will be noted that the surface area covered by the six burners in each set or assembly 205 provide relatively uniform coverage of the hearth area in its respective half of the furnace and provide thereby more uniform heating, optimal thermal transfer and reduced exposure of roof 203 to the effect of the burner flames.

A burner 211, as illustrated in FIGURE 36 comprises a barrel 227 and a back 228. The barrel is provided with the number of concentric passages held in position by respective thin radial connectors 229 at circumferentially spaced distances to hold cylindrical members 230 in place. The two outer concentric passages 231 form a reentrant cooling passage with inlet and outlet fittings 232 connected to corresponding rigid piping fixed at 210 from whence by respective flexible hose connections 233 on each side of the furnace, the respective fluids are conducted to respective rigid stand pipes 234 connected to the structural frame of the furnace. A further concentric passage 235 may be provided for a combustion supporting or comburent gas such as compressed air or oxygen to increase, when used, the atomization of the fuel oil when fuel oil instead of fuel gas is the fuel feed to burner 211, or the intensity of the combustion of the issuing combustible mixture. Such combustion supporting air or oxygen enters through a piping fitting 236, passes around the outside of the innermost concentric passage and is discharged around the outside of an atomization nozzle 237 at the discharge end of burner 211. A cylindrical seal 238 is provided so that such compressed gas will not enter the back 228 of the burner or the central passage 239 for preatomized fuel oil. The central passage 239 discharges through a venturi opening 240 through the center of nozzle 237. The piping connection to fitting 236 is distinct from but made in the same way as either connection in the cooling water circuit to one of the fittings 232. When burner 211 is not being utilized as a burner, it may nevertheless be utilized as an oxygen-supplying pipe to the interior of furnace 200 and material therein on hearth 201.

Back 228 comprises a preatomization cylinder 241 having a compressed air or steam inlet fitting 242 attached thereto to supply preatomizing air or steam into an annular passage 243 from whence it flows through peripheral openings 244 into mixing chamber 245 where the preatomizing agent mixes with oil discharged from a nozzle tip 246 at the discharge end of a passageway 247 to which fuel oil is supplied at the head thereof by a pipe 248. Passage 248 is in a cap 249 for cylinder 241 and is held in place by a removable clamp subassembly 250. In operation, the atomized fuel is discharged at relatively high velocity through nozzle opening 240 where it meets additional air or oxygen from passage 235 when such additional air and oxygen is used and, in addition, preheated combustion air supplied to the furnace interior by an air passage 202. The barrel 227 and back 228 of burner 211 are provided with respective flanges which are coupled together by bolts and sealed by an annular seal 251. The pipe connections to inlet fittings 236 and 242 and supply pipe 248 may also extend to rigid pipes clamped at 210 to the outer sides of the respective carriage 208, which in turn may be connected to flexible hoses such as the hose 233 on each side of the furnace and a fixed pipe in the stand similar to pipes 234, or other connections with flexible portions may be made for the piping to the burners. Hence, in any movement of a carriage 208, there is no disturbance or "working" of the immediate connections to the respective forward firing burners 211 and the respective movements of the carriage being taken up by the respective flexible parts of the respective connections.

The buckstays at the respective ends of furnace 200 may be rigidly secured to a cross member 252 to which there is affixed an A-frame 253 for rigid connection to and support of the upper end of the respective runway 212. Shimming plates may be poistioned between the cross member 252 and the posts of frame 253 to selectively vary the height thereof and thereby adjust to a desired angle, the slope of runway 212 independently of the orientation of the burners 211 in each set about the transverse pivot axes of supports 221. The cables 217 for each carriage 208 pass over pulley 216 and under a double grooved guide pulley 254 which is also rotatably fixed to the structural frame of the furnace. Each guide pulley 254 directs the cable pair 217 to a tower pulley 255 supported at the top of a tower 256 in which hangs a counterweight 257, to the upper end of which the cable pair 217 is secured. Tower 256 also rotatably supports a top sprocket wheel 258 and a bottom sprocket wheel 259. An endless sprocket chain 260 extends around both sprockets, the respective ends of each chain being anchored to the top and bottom of counterweight 257. Sprocket 259 is operatively connected by another chain or belt to a driving sprocket or pulley 261 capable of being turned in either direction by a reversible electric motor 262 through an electromagnetic clutch 263 and gear reducer 264, the motor 262 being connected in the control circuitry for the furnace operation including that for automatic reversing thereof, which circuitry is known to those skilled in the open hearth furnace control circuit art. Whenever motor 262 is not energized, a hand wheel 265 is operatively connected to drive sprocket 261 so that the respective carriage 203 connected thereto can be moved manually.

An alternative arrangement to that illustrated in FIGURE 31 is shown in FIGURES 37 and 38 whereby a person operating the furnace can select the desired extent of burner projection into the furnace by reference to an exterior scale without looking through the furnace door wickets or other peephole devices that may be provided. Thus, a set of burners 300 mounted on a platform 301 attached to a carriage 302 which is movable along its inclined runway 303, all constructed substantially as hereinabove described, is shown descending to the bottom of their travel path through a furnace roof 304, which has also been reached, a furnace hearth being indicated at 305. The descent is regulated by a reversible electric or pneumatic motor-reducer set 306 on a foundation 307, said motor having a drum connection to pay out or draw in a cable 308 which is dead-ended at the other end in carriage 302, the cable passing over runway pulley 309. A second cable 310 also has one end anchored in carriage 302 from which it passes over pulley 309 and extends farther to engage a pulley 211 secured to the top of a tower in which a counterweight 312 is suspended from the other end of cable 310. Counterweight 312 has trips 313 and 314 respectively for a regulation switch 315 and an upper limit switch 316. An endless chain or cable 317 passes over upper and lower sprockets 318 and 319 fixed to the tower or a separate frame, a crank 320 being affixed to the lower pulley 319 to selectively adjust the height of switch 315. A visual height scale 321 is secured in juxtaposition to a vertical reach of chain 317, which may have an indicating pointer 322 thereon. As shown in the figure, pointer 322 indicates that the switch 315 is set for full extension of the burners 300 into the furnace interior and provides in cooperation with scale 321 a direct reading indicator for the position of the burners 300 within the furnace without having to look directly at such burners for that information.

In the operation of the alternative system shown in FIGURES 37 and 38, a lower push button 323 has been pushed to start the burner descent, presently shown as proceeding, thereby energizing motor 306 through coil 324 for a burner descending operation. Before push button 323 was closed, regulation switch 315 was moved to the travel bottom position shown in FIGURE 37, a fact recorded directly by indicator 322. When the burners 300 reach the bottom of their travel, the trip 313 will open switch 315 and shut off motor 306 which may be provided with a magnetic brake, if desired, which is automatically applied the instant the motor shuts off. A limit switch 316 is engaged at the same instant, in the FIGURE 37 operation, by trip 314, such upper limit switch acting as a safeguard in the event that during a descent, the trip 313 should pass switch 315 without stopping a descending operation. Conversely, if it is desired to move the burners up, the person operating the crank 320 will move the indicator 322 to the height above the hearth desired as shown by scale 321. Thereupon, rise button 325 will be pushed commencing a burner raising operation of motor 306 by energizing it through coil 326, the power for all such operations being provided by electric power lines 327. When the burners in the ascending operation have reached the desired stopping place, trip 313 will open regulation switch 315, stopping the burners at the desired level in the furnace. A lower limit switch 328 which cooperates with trip 314 is included to insure that the burners cannot rise above their extreme retracted position.

FIGURE 39 illustrates one possible schematic circuit 350 extending across a pair of electric power lines 351 in optional interlock with a schematic door operating circuit 352, both such circuits having circuit breakers 353 or other protectors against excess current flows or short-circuits. In diagram 350, a reversible electric motor 354, corresponding to motor 262 for example, is shown with respective cooperating coils 355 and 356 for the alternative lowering or raising operation of one or more than one set of burners. Assuming that the burners are at the bottom of their travel closest to the hearth, a limit switch 357 on the lower side of the diagram is held open while an upper limit switch 358 is in its normally closed position. If it is desired to raise the burners, a pushbutton switch 359 is pushed closing a circuit through electric conductor 360 and energizing coil 356 to cause the motor to turn in a burner raising direction. As soon as the burners start to rise, the limit switch 357 will move to its normally closed position. The energization of coil 356 will open a safety switch 361 so that the burners will continue to rise even though the lower pushbutton 362 should inadvertently be pressed; and such raising of the burners will continue until a normally closed stop switch 363 is opened, or button 359 released where there is no routine seal-in bypass jumper arrangement therefor energizable by a momentary push of such button. When the burner rise circuit is broken, motor 354 stops under the effect of a magnetic brake or other suitable arrangement and switch 361 is reclosed to return to its normally closed at rest position, as will stop switch 363 as soon as the motor stops. Conversely, whenever the burner unit is above its bottommost travel position, if it is desired to lower it, pushbutton 362 is pressed energizing motor 354 through coil 355 in a reverse direction and opening switch 364 in the rise side of the circuit until either pushbutton 362 is released, or stop switch 363 is opened.

A schematic door operating circuit 352 operates in the same manner with a closed (lower) pushbutton 365 and an open (rise) pushbutton 366, respective limit switches 367 and 368 and respective safety switches 369 and 370 responsive respectively to the rise coil 371 and lowering coil 372, which effect the direction of rotation of a reversible electric door operating motor 373. A normally closed stop switch 374 is also provided.

If it is desired to interlock the operation of a furnace door with a set of burners behind such door, an interlock conductor mechanism 375 may be provided extending between coils 371 and 356. An auxiliary burner unit rise switch 376 (normally open) and fuel feed cessation switch 377 (normally open) are connected to mechanism 375, such switches 376 and 377 being connected electrically across switch 359 by suitable conductors one of which, conductor 378, is provided with a switch 379 therein to connect or disconnect the interlock mechanism as desired. As shown, switch 379 is closed and the door operated by circuit 352 is closed so that if button 366 is pushed to open that door, switches 376 and 377 are closed energizing coil 356 and thereby motor 354 to raise the burner unit out of the way as the furnace door uncovers the furnace door opening for charging or other purpose, as well as shutting off the fuel to such unit through switch 377. In that way, it is possible, if desired, to avoid damaging a burner assembly mechanism by means of a charging machine when the interlock feature is turned on because as the door is lifted to uncover the furnace opening to admit the charging machine, the burner unit will also lift and get out of the way of such charging machine. Conversely, when the door is closed, switches 376 and 377 are opened and motor 354 stops. If it is then desired to lower the burners, pushbutton 362 is pressed to return the burners to their original position or to any other desired level within the furnace interior, or the burners can be switched over to the automatic furnace operating circuit.

Features of my invention may be utilized in various arrangements and permutations. Further, a single set of burners may be utilized in an open hearth or other kind of furnace covering the entire hearth area for operation at the optimum selected distance and fuel input rates for the selected service and object to be accomplished; and/or, if desired, all of the combustion supporting oxygen-containing gas may be supplied through the burner barrels. Still further, various changes may be made in the illustrated embodiments and other embodiments provided without departing from the spirit of my invention or the scope of the appended claims.

I claim:

1. In a direct fired furnace to heat material on a hearth apparatus comprising, in combination, a hearth for material to be heated a roof positioned a substantial distance above said hearth, said hearth having a lateral boundary, a plurality of elongated burners having discharge ends and a length sufficient for said discharge ends to be moved to a position relatively close to the top of said hearth and inwardly of said boundary, said discharge ends being extendable downwardly below said roof toward said hearth in the space directly thereabove to discharge fluid fuel under pressure in a corresponding plurality of streams directed toward said material to be turned in a corresponding plurality of flames of selected length normally comprising a minor portion of said distance, said discharge ends of said burners being spaced apart from each other, means for supplying combustion supporting gas to the interior of said furnace for the combustion of said streams of fluid fuel, means for respectively moving said discharge ends of said burners in the space between said roof and hearth spaced inwardly of said boundary between positions relatively close to the top of said hearth and farther away from said hearth to selected operated distances therefrom respectively corresponding substantially to the selected length of said flames, whereby said material may be subjected to direct heating by the zones of maximum heating action of said flames respectively and to the extent desired for said material at the time being.

2. In an open hearth furnace or the like having preheated combustion air passageways at the respective ends thereof, a hearth and a roof above said hearth, apparatus comprising for each right and left half of the furnace, in combination, a plurality of port openings extending through said roof generally toward said hearth, a plurality of spaced substantially parallel elongated tubular burners extending through said port openings, a runway extending above the top of said furnace and inclined downwardly and inwardly in the direction of said hearth, a carriage reciprocable on said runway, a horizontal platform secured to said carriage, said burners being connected to said platform to project through said port openings a variable preselected amount toward said hearth, pipe means to conduct at least fluid fuel to said burners in all positions thereof, means for moving said carriage to adjust the distance between the discharge ends of said burners and said hearth in the course of a furnace operation, whereby said burners are readily adjusted for optimal heating of material on said hearth and adjustment thereof as required in the course of a furnace operation.

3. A furnace as set forth in claim 2, comprising, said preheated combustion air passages comprising alternately operative openings at the sides of said furnace for preheated combustion air, means for directing said combustion air into said interior of said furnace in a sweep across the underside of said roof into engagement with the streams of fluid fuel from said burners, said plurality of burners comprising two sets of more than one burner each, one set being positioned on each side of said furnace, each set being directed toward and adapted for substantially generally covering the area of said hearth on that side of said furnace by burner products, the burners in each set further being spaced and generally parallel and forming a relatively steep angle with a horizontal plane, the burners in both sets comprising a generally V-shaped arrangement in front elevation.

4. In a direct fired furnace as set forth in claim 3, comprising, a plurality of partitions to provide at least partially separated ducts leading from said openings on said sides to conduct said combustion air, said ducts being in alignment with respective ones of said burners whereby assurance that an adequate quantity of combustion air reaches each of said burners is promoted, irrespective of the distance thereof from the place of introduction of said combustion air.

5. A direct fired furnace as set forth in claim 3 having the discharge ends of said plurality of burners on each side of said furnace at predetermined different levels.

6. In a furnace of an open hearth type to be heated directly by the combustion of fluid fuel, apparatus comprising, in combination, a hearth for material to be heated thereon, a roof covering said hearth, a plurality of burners projecting downwardly through said roof toward said hearth, said burners forming a regular pattern above said hearth and together generally covering substantially the entire area thereof, means for passing fluid fuel through said burners for discharge toward said hearth, means for supplying combustion supporting gas to the vicinity of said burners for combustion of said fluid fuel, means mounting said burners on at least one side of said furnace for movement together relative to said hearth to heat said material and maintain a selected distance between said burners and the surface of said material, and indicator means for regulating the position of said last-mentioned means to maintain said selected distance optionally inclusive of a burner position relatively close to said hearth.

7. In a furnace or the like having a hearth and a roof above said hearth, apparatus comprising, in combination, a plurality of port openings extending through said roof generally toward said hearth in an area pattern, a plurality of elongated tubular burners extendible through said port openings, runway means extending above the top of said furnace and toward said hearth, carriage means reciprocable on said runway means, said burners being connected to said carriage means to project through said port openings at least during operation a variable preselected amount toward said hearth, means for supplying at least fluid fuel to said burners in all positions thereof, means for supplying combustion supporting gas to said furnace, and means for moving said carriage means to adjust the distance between the discharge ends of said burners and said hearth in the course of a furnace operation, whereby said burners are readily adjusted for optimal heating of material on said hearth and adjustment thereof as required in the course of a furnace operation.

8. A furnace or the like as set forth in claim 7, having, means connected to said carriage means to move it along said runway means, a prime mover operatively connected to said last-named means to control the adjusted position of said carriage means along said runway means and correspondingly position the discharge ends of said burners relative to said hearth, a vertically movable regulation switch to control the position of said discharge ends, visual indicating means to indicate the position of said regulation switch and thereby the height of said discharge ends, means for stopping said prime mover upon actuation of said regulation switch to position said discharge ends at selected height, and upper and lower stop limit switch means to stop said prime mover at the respective limits of movement in the available travel path of said burners.

9. A furnace as set forth in claim 7, having, cable means for operating said carriage means along said runway means, a counterweight connected to said cable means, and a reversible prime mover operatively connected to said cable means to adjust the position of said carriage means along said runway means and correspondingly position the discharge ends of the burners carried thereby relative to said hearth.

10. A furnace as set forth in claim 7, having, means for adjusting the angle of inclination of said burners relative to said hearth, said port openings having a clearance space around said respective burners extending therethrough.

11. A furnace as set forth in claim 7, having, one or more furnace openings at the front thereof normally closed by doors, means for automatically raising said burners upon any opening of a furnace door in front thereof, whereby said burners are protected against being struck by anything inserted through the furnace opening normally closed by said door.

12. A direct heating furnace, comprising, in combination, a furnace chamber for material to be heated, a roof in said furnace positioned above said material, a plurality of direct flame heating means movable between a position adjacent but below said roof and a position above but adjacent said material, means for moving said direct heating means to maintain the surface of said material during heating subject to the maximum heating action of said flames of said heating means substantially over the surface of said material irrespective of the selected quantity of fuel fed to said heating means, means providing for the generation of a predetermined heat output by said heating means in any adjusted position of said heating means within said chamber, means indicating the position of the surface of said material to be heated and means for selective movement of said heating means in correspondence with any movement of said surface.

13. A direct heating furnace as set forth in claim 12 having means outside of said furnace indicating the position of said heating means in said chamber.

14. A direct heating furnace as set forth in claim 12 having a charging door to provide access to said chamber and means for raising said heating means upon opening of said charging door.

15. A direct fired furnace as set forth in claim 12, in which said heating means comprises a plurality of forward-firing burners in spaced pattern arrangement extendable through said roof and having discharge ends projecting into the space directly above said hearth, the area covered by the pattern formed by said discharge ends adapted for covering a substantial portion of said hearth with burner products at least when substantially adjacent the top thereof, said roof further having port openings for said burners.

16. In a direct fired heating furnace having a hearth for material to be heated, apparatus comprising, in combination, a roof covering said hearth and defining a furnace chamber extending directly above said hearth and below said roof, at least a portion of said roof being movable to vary its distance from said hearth, means for moving at least said portion of said roof, burner means operatively connected to said portion of said roof and extending into said furnace chamber, said first-named means having a sufficient range of movement to move said burner means to a position within said furnace chamber directly above said hearth and substantially adjacent the top thereof and correspondingly change the volume of said furnace chamber.

17. A direct heating furnace as set forth in claim 16, having said portion of said roof in the form of a panel extending over a substantial portion of said hearth and said heating means in the form of a plurality of burners extending through said panel arranged in a predetermined pattern with their discharge ends directed toward said hearth and adapted for substantially covering at least a portion of said hearth directly beneath said panel with burner products.

18. In a direct heating furnace, apparatus comprising, in combination, a movable hearth for material to be heated, a movable roof above said hearth, a furnace chamber extending between said hearth and roof, heating means adjustably movable in said furnace chamber through a path extending from a position adjacent said roof to a position adjacent said hearth as selected, means for moving said roof substantially vertically, means for moving said hearth substantially vertically, and means to move said heating means within said furnace chamber along said path.

19. In a direct fired furnace to heat material, apparatus comprising, in combination, a hearth for said material to be heated, a roof covering said hearth, a carriage member, a plurality of elongate burners mounted on said carriage member in generally parallel relation and extending downwardly through said roof toward said hearth to discharge fluid fuel under pressure in a corresponding plurality of streams to be burned in a corresponding plurality of flames directed toward said material, said burners being spaced apart from each other in a regular pattern, means for supplying combustion supporting gas to the interior of said furnace for the combustion of said streams of fluid fuel, means for moving said carriage member to move said burners together to spaced apart positions relatively close to material on said hearth and away from said hearth to selectively vary the distance therefrom respectively, said carriage member being in the form of a portion of said roof, a plurality of said burners extending through said portion of said roof, and means for moving at least said portion of said roof in translation to change the distance between said burners and said hearth, whereby said material may be subjected to direct heating engagement by the zone of maximum heating action of said flames respectively, irrespective of differences in height of material on said hearth, or in selected length of said flames.

20. In a method of operating a mineral material heating furnace or the like having a laterally bounded hearth, a roof above said hearth and elongate direct firing burner means having discharge means, said discharge means being substantially extendable into the furnace space from said roof substantially directly above said hearth for movement spaced inwardly of said lateral boundary in a heating operation to a position substantially adjacent the top of said hearth, the steps comprising, in combination, supplying fluid fuel to said burner means to be directed toward said hearth from the space immediately thereabove in respective successive predetermined quantities determined by the respective temperature and conditions of material on said hearth to be heated thereby during a heating operation, supplying combustion supporting gas to combust said fuel in said space as flame issuing from said discharge means, adjusting at least the supply of said fluid fuel to regulate said flame normally to a length which is a minor portion of the distance between said hearth and said roof, and progressively moving said discharge means of said burner means in said space to respective positions spaced inwardly of said lateral boundary between ones substantially superadjacent said hearth and ones nearer said roof to correlate any change in the quantity of fuel so supplied and flame length with any change in the distance between said discharge means and material respectively to maintain efficient direct flame heating of said material consonant with any change in the position of the surface of said material and any change in the heating requirement at the time being in said heating operation.

21. Method of heating mineral material in an open hearth furnace or the like having charging openings normally closed by furnace doors, a hearth for said mineral material, a roof covering said hearth, a plurality of elongate burners extending through said roof directed toward said hearth and having outlet means selectively progressively movable from a position relatively close to said roof to a position relatively close to said hearth during use, comprising, in combination, charging mineral material to said hearth through at least one said charging opening when its respective furnace door is raised, supplying fluid fuel to at least said burners on one side of said furnace at one time to operate the same, supplying combustion supporting gas to said operating burners for admixture with said fluid fuel and combustion toward said hearth, progressively moving said outlet means of said operating burners between positions ranging between a position substantially adjacent said roof and a position superadjacent said hearth to substantially continuously provide at least one selected spatial distance relation between said operating burners and said mineral material on said hearth.

22. A method of operating a mineral material heating furnace or the like as set forth in claim 21, the further steps comprising, combusting said fluid fuel in said furnace in a plurality of generally downwardly parallel streams directed toward said hearth and material thereon, the combustion products of said streams particularly when adjacent the top of said hearth adapted to cover a substantial portion thereof including a portion of said hearth intermediate the ends of said furnace.

23. A method as set forth in claim 21, comprising, detecting the occurrence of any change in the position in space of the surface of said mineral material and any change in the temperature of said mineral material, respectively, and moving of said operating burners automatically in response to said detecting, respectively.

24. In a furnace of an open hearth type, or the like, to be heated directly by the combustion of fluid fuel, apparatus comprising, in combination, a hearth for mineral material to be heated thereon, a roof covering said hearth, a plurality of burners extending from the outside of said furnace into the interior thereof and downwardly toward said hearth, said burners being selectively operated and spaced relative to one another and at least together adapted for generally covering substantially the entire area of said hearth with burner products, means for feeding fluid fuel at a predetermined rate to said burners for discharge through the inner ends thereof toward said hearth, means for supplying combustion supporting gas at least to the vicinity of said burners for combustion of said fluid fuel, at least one of said burners extending through said roof and having outlet means at the inner end thereof, means for moving said inner end during heat treatment of said mineral material between a position of said inner end relatively close to said hearth and a position of said inner end farther from said hearth substantially in accordance with the position of the surface of said mineral material and the thermal intensity of said last-mentioned burner, respectively, said last-mentioned burner having a capacity effective to provide a significant portion of the heat required for the operative procedure on said mineral material.

25. Apparatus as set forth in claim 24, comprising, at least one burner on each side of said furnace extending through said roof, each having an outlet means at the inner end thereof, said means for moving the inner end of each of said last-mentioned burners being substantially independent and coordinated, each of said last-mentioned burners being at a relatively steep angle to the horizontal and directed toward said hearth, and said means for supplying said combustion supporting gas including supplying at least a portion thereof through said last-mentioned burners respectively.

26. Apparatus as set forth in claim 24, comprising, means responsive to a change in position of said surface of mineral material for automatically moving said inner end of said last-mentioned burner generally in accordance with said change.

27. Apparatus as set forth in claim 24, comprising, means responsive to a predetermined temperature of mineral material on said hearth for automatically positioning said inner end of said last-mentioned burner to maintain said predetermined temperature.

28. Method of melting mineral material in an open hearth furnace or the like having a hearth for said mineral material, said hearth having a lateral boundary, a roof covering said hearth spaced a substantial distance therefrom, and elongate burner means having discharge means in said furnace directed toward said hearth and movable in the space between said roof and hearth spaced inwardly of said boundary from a position adjacent said roof to a position relatively close to said hearth, comprising, in combination, charging solid mineral material to said hearth, supplying fluid fuel to said burner means for discharge of flame from said discharge means toward said mineral material on said hearth, supplying combustion supporting gas for admixture with said fluid fuel and resulting combustion in order to melt down said mineral material upon said hearth as a consequence of said combustion so that the surface of said mineral material will recede and change its height and distance from said roof, selectively positioning said discharge means of said burner means an appreciable distance beneath said roof and toward said hearth to provide a generally predetermined spatial distance between said discharge means and said mineral material at an initial stage of said combustion for optimal thermal transfer from said combustion to said mineral material, and progressively moving said discharge means of said burner means away from said roof toward said hearth spaced inwardly of said boundary until said discharge means is superadjacent said hearth to substantially maintain said spatial distance as melting down of said mineral material occurs on said hearth.

References Cited in the file of this patent

UNITED STATES PATENTS

| | | |
|---|---|---|
| 757,606 | Falk | Apr. 19, 1904 |
| 924,025 | Wilshire | June 8, 1909 |
| 2,063,402 | Rossman | Dec. 8, 1936 |
| 2,078,348 | Simpson | Apr. 27, 1937 |
| 2,084,830 | Barnard et al. | June 22, 1937 |
| 2,126,272 | Morton | Aug. 9, 1938 |
| 2,172,105 | Parker | Sept. 5, 1939 |
| 2,490,382 | Schueler | Dec. 6, 1949 |
| 2,499,624 | Bergstrom et al. | Mar. 7, 1950 |
| 2,542,684 | Laverdisse et al. | Feb. 20, 1951 |
| 2,671,987 | Jendrisak | Mar. 16, 1954 |
| 2,675,864 | Seaver | Apr. 20, 1954 |
| 2,970,829 | Reynders | Feb. 7, 1961 |

UNITED STATES PATENT OFFICE
CERTIFICATE OF CORRECTION

Patent No. 3,129,930  April 21, 1964

André Pierre Honoré Labat-Camy

It is hereby certified that error appears in the above numbered patent requiring correction and that the said Letters Patent should read as corrected below.

Column 1, line 25, for "in-put" read -- in-part --; column 4, line 59, for "diagrammataic" read -- diagrammatic --; column 15, line 27, for "operations" read -- operation --; column 19, line 29, for "also" read -- almost --; column 21, line 22, after "hearth" insert a comma; line 24, after "heated" insert a comma; line 33, for "turned" read -- burned --; same column 21, line 43, for "operated" read -- operative --.

Signed and sealed this 15th day of September 1964.

(SEAL)
Attest:

ERNEST W. SWIDER
Attesting Officer

EDWARD J. BRENNER
Commissioner of Patents